US010400071B2

(12) United States Patent
Achenbach et al.

(10) Patent No.: US 10,400,071 B2
(45) Date of Patent: Sep. 3, 2019

(54) SILICONE COMPOSITIONS FOR PRODUCING ELASTOMERIC MOLDED PARTS BY MEANS OF BALLISTIC METHODS

(71) Applicant: Wacker Chemie AG, Munich (DE)

(72) Inventors: Frank Achenbach, Simbach (DE); Werner Brennenstuhl, Burgkirchen (DE); Siegfried Dormeier, Stubenberg (DE); Ernst Selbertinger, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 77 days.

(21) Appl. No.: 15/556,976

(22) PCT Filed: Nov. 8, 2016

(86) PCT No.: PCT/EP2016/077016
§ 371 (c)(1),
(2) Date: Sep. 8, 2017

(87) PCT Pub. No.: WO2017/081028
PCT Pub. Date: May 18, 2017

(65) Prior Publication Data
US 2018/0066115 A1 Mar. 8, 2018

Related U.S. Application Data

(63) Continuation-in-part of application No. PCT/EP2015/077987, filed on Nov. 27, 2015.

(30) Foreign Application Priority Data

Nov. 9, 2015 (DE) .................. 10 2015 222 030

(51) Int. Cl.
| | |
|---|---|
| *C08L 83/04* | (2006.01) |
| *C08G 77/38* | (2006.01) |
| *C08K 3/36* | (2006.01) |
| *C08G 77/20* | (2006.01) |
| *B33Y 70/00* | (2015.01) |
| *C08J 3/24* | (2006.01) |
| *C08G 77/12* | (2006.01) |
| *C08G 77/14* | (2006.01) |
| *B29C 64/112* | (2017.01) |
| *B29K 83/00* | (2006.01) |

(52) U.S. Cl.
CPC .............. *C08G 77/38* (2013.01); *B33Y 70/00* (2014.12); *C08G 77/20* (2013.01); *C08J 3/24* (2013.01); *C08K 3/36* (2013.01); *C08L 83/04* (2013.01); *B29C 64/112* (2017.08); *B29K 2083/00* (2013.01); *C08G 77/12* (2013.01); *C08G 77/14* (2013.01); *C08J 2383/07* (2013.01)

(58) Field of Classification Search
CPC ....................................................... C08L 83/04
See application file for complete search history.

(56) References Cited

U.S. PATENT DOCUMENTS

| | | | |
|---|---|---|---|
| 3,884,866 | A | 5/1975 | Jeram et al. |
| 5,057,151 | A | 10/1991 | Schuster et al. |
| 5,582,876 | A | 12/1996 | Langner et al. |
| 5,686,054 | A | 11/1997 | Barthel et al. |
| 6,359,098 | B1 | 3/2002 | Fehn et al. |
| 6,641,772 | B2 | 11/2003 | Gelbart |
| 6,942,830 | B2 | 9/2005 | Muehlhaupt et al. |
| 8,088,878 | B2 | 1/2012 | Koellnberger |
| 8,314,200 | B2 | 11/2012 | Jandke et al. |
| 8,378,004 | B2 | 2/2013 | Angermaier et al. |
| 8,940,851 | B2 | 1/2015 | Mueller |
| 9,339,839 | B2 | 5/2016 | Fliess et al. |
| 2004/0131527 | A1 | 7/2004 | Gottschalk-Gaudig et al. |
| 2007/0049652 | A1 | 3/2007 | Ito |
| 2009/0225640 | A1 | 9/2009 | Manabe et al. |
| 2010/0256300 | A1 | 10/2010 | Jandke et al. |
| 2010/0292361 | A1 | 11/2010 | Koellnberger |
| 2011/0003906 | A1 | 1/2011 | Angermaier et al. |
| 2011/0196096 | A1 | 8/2011 | Angermaier et al. |
| 2013/0200554 | A1 | 8/2013 | Mueller |
| 2014/0079916 | A1 | 3/2014 | Grebe et al. |
| 2014/0081192 | A1 | 3/2014 | Wenske et al. |
| 2015/0014881 | A1 | 1/2015 | Elsey |
| 2016/0312034 | A1 | 10/2016 | Schneider et al. |
| 2017/0312981 | A1 | 11/2017 | Selbertinger et al. |

FOREIGN PATENT DOCUMENTS

| | | |
|---|---|---|
| CN | 1450953 A | 10/2003 |
| CN | 103660298 A | 3/2014 |
| DE | 3839900 A1 | 5/1990 |
| DE | 100 24 618 A1 | 4/2001 |
| DE | 199 50 284 A1 | 4/2001 |
| DE | 101 11 422 A1 | 9/2002 |
| DE | 101 52 878 A1 | 5/2003 |
| DE | 102008000156 A1 | 7/2009 |
| DE | 102008043316 A1 | 5/2010 |
| DE | 102009002231 A1 | 10/2010 |
| DE | 102009027486 A1 | 1/2011 |
| DE | 102010043149 A1 | 5/2012 |
| DE | 102011012412 A1 | 8/2012 |
| DE | 102011012480 A1 | 8/2012 |
| DE | 10 2012 204 494 A1 | 9/2012 |
| DE | 10 2011 108 799 A1 | 1/2013 |
| DE | 102013226494 A1 | 6/2015 |

(Continued)

OTHER PUBLICATIONS

Andreas Ostendorf et al., "Two-Photon Polymerization: A New Approach to Micromachining." Photonics Spectra 2008, 10, 9 pages.

(Continued)

*Primary Examiner* — Caixia Lu
(74) *Attorney, Agent, or Firm* — Brooks Kushman P.C.

(57) ABSTRACT

3D printing of curable silicone cam positions is made possible by employing a mixture of Si—H-functional silicon compounds and silicon compounds bearing aliphatically unsaturated groups, a hydrosilylation catalyst, and a combination of a reinforcing filler and a rheological agent containing polar groups, exhibiting shear thinning behavior.

9 Claims, 6 Drawing Sheets

(56) References Cited

FOREIGN PATENT DOCUMENTS

| | | |
|---|---|---|
| EP | 0122008 A1 | 10/1984 |
| EP | 0146307 A2 | 6/1985 |
| EP | 0358452 A2 | 3/1990 |
| EP | 0398701 A2 | 11/1990 |
| EP | 0 561 893 B1 | 9/1993 |
| EP | 0 561 919 B1 | 9/1993 |
| EP | 0686676 A1 | 12/1995 |
| EP | 1050538 A2 | 11/2000 |
| EP | 1 077 226 A1 | 2/2001 |
| EP | 1433749 A1 | 6/2004 |
| EP | 1803728 A1 | 7/2007 |
| EP | 2 676 633 A1 | 12/2013 |
| WO | 9210529 A1 | 6/1992 |
| WO | 9210543 A1 | 6/1992 |
| WO | 93/08506 A1 | 4/1993 |
| WO | 95/25003 A1 | 9/1995 |
| WO | 96/30182 A1 | 10/1996 |
| WO | 2009027133 A2 | 3/2009 |
| WO | 2012166870 A1 | 12/2012 |
| WO | 2013/091003 A1 | 6/2013 |
| WO | 2014018814 A1 | 1/2014 |
| WO | 2015059502 A1 | 4/2015 |
| WO | 2015107333 A1 | 7/2015 |
| WO | 2016/071241 A1 | 5/2016 |

OTHER PUBLICATIONS

Gebhart, A., "Generative Fertigungsverfahren," Carl Hanser Verlag, 2013, 14 Pages.
Gebhart, A., English Abstract for "Generative Fertigungsverfahren," Carl Hanser Verlag, 2013, 1 Page.
Derby, Brian, "Inkjet Printing of Functional and Structural Materials: Fluid Property Requirements, Feature Stability, and Resolution," Annu. Rev. Mater. Res., 2010, vol. 40, pp. 395-414, University of Manchester, United Kingdom, 22 Pages.
Sears, G.W., "Determination of Specific Surface Area of Colloidal Silica by Titration with Sodium Hydroxide," Analytical Chemistry, Dec. 1956, vol. 28, No. 12, p. 1981-1983 (3 Pages).
Israelachvili, J.N., "Intermolecular and Surface Forces," 3rd Ed., Academic Press, 2011, p. 316 (3 Pages).
English abstract for DE 102011012412 A1.

SILICONE COMPOSITIONS FOR PRODUCING ELASTOMERIC MOLDED PARTS BY MEANS OF BALLISTIC METHODS

CROSS REFERENCE TO RELATED APPLICATIONS

This application is the U.S. National Phase of PCT Appln. No. PCT/EP2016/077016 filed Nov. 8, 2016, which claims priority to German Application No. 10 2015 222 030.3 filed Nov. 9, 2015 and PCT No. PCT/EP2015/077987, filed Nov. 27, 2015, the disclosures of which are incorporated in their entirety by reference herein.

BACKGROUND OF THE INVENTION

1. Field of the Invention

The invention relates to crosslinkable silicone compositions, the inventive properties of which enable the production of elastomeric shaped bodies by means of ballistic additive methods (3D printing).

2. Description of the Related Art

Numerous methods are available for the production of elastomeric moldings proceeding from crosslinkable silicone rubber compositions. According to the consistency and mechanism of crosslinking of the silicone rubber composition, moldings can be produced, for example, by injection molding, by compression molding, by extrusion methods, by calendering, casting, etc. What is common to these conventional methods is that the properties of the molding formed (hardness, tear resistance, extensibility, color etc.) are fixed essentially by the physical composition of the crosslinkable silicone rubber composition, which means that these methods typically afford silicone moldings that are substantially isotropic in terms of their mechanical, optical and electrical properties. The shape of the silicone parts formed in this way is fixed either through use of specific molds (injection molds, press-molding molds, casting molds), within which the crosslinking is effected, or by means of extrusion dies, calendering rolls etc.

However, the conventional processing methods are increasingly meeting their limits when silicone moldings of more complex geometry, of different material composition and/or of variable profiles of properties are required. The general trend toward individualization and individual adjustment of everyday articles is additionally requiring smaller numbers of items (e.g. prototypes, individually adapted prostheses, etc.), the necessity of rapid availability and simple changeover to new product series, which means that conventional methods are no longer efficient.

A method that is becoming increasingly important for production of moldings is the additive manufacturing method (3D printing method), which comprises numerous different techniques having the common factor of automated additive layer buildup of the molding (A. Gebhardt, Generative Fertigungsverfahren [Additive Manufacturing Methods], Carl Hanser Verlag, Munich 2013). The additive manufacturing method not only makes it possible to avoid the above mentioned shortcomings of the conventional processing methods, but also enables a fundamentally new design of molded articles.

The additive layer-by-layer buildup of the molding can be effected by crosslinking an applied layer of the crosslinkable material in a location-selective manner. Location-selective crosslinking can be effected, for example, by means of a UV or IR laser. Location-selective crosslinking can also be brought about by applying an agent that initiates crosslinking (e.g. catalyst) at exact locations by injection, jetting, spraying, etc., as described for the production of silicone elastomer parts in WO2015/059502 A1. Location-selective crosslinking means that only that material in the layer which forms the later molded article is crosslinked; the uncrosslinked material is ultimately removed and can optionally be reused. However, additive layer-by-layer buildup of the molding can also be effected by applying the crosslinkable material in a location-selective manner (for example by means of a printhead in the form of discrete droplets), i.e. only at those sites that will be part of the shaped body to be formed. The layer applied in this way will generally not be continuous, but will directly reflect a cross section of the desired body shape. The material applied in a location-selective manner is subsequently crosslinked (for example by full-area irradiation), and the next layer is applied in a location-selective manner, etc. If necessitated by the shape of the part to be printed (for example in the case of overhanging structures, cavities etc.), it is possible to apply a suitable support material in addition to the crosslinkable silicone material, which can be removed again after the printing operation has ended. The location-selective application of the crosslinkable material can be effected, for example, by means of discontinuous (discrete) jetting of droplets (by what are called "ballistic methods") or by continuous dispensing of thin strands. In principle, jetting as compared with dispensing enables the printing of finer structural details and more complex structures. The advantage of dispensing is that it is possible to apply greater amounts of material per unit time. In addition, dispensing enables application of higher-viscosity materials as well, such that it can be advantageous to combine the two techniques by also mounting one or, if appropriate, more than one dispensing nozzle in addition to the jetting nozzle(s) in the 3D printer. In this way, it is possible, for example, to form filigree parts of the shaped body by means of the jetting nozzle and to print larger voluminous parts of the shaped body by dispensing. With regard to the rheological demands that jetting and dispensing make on the material to be printed, jetting is found to be significantly more demanding.

WO2015/107333 A1 describes a 3D printing method for production of prostheses from silicone elastomers by (continuous) extrusion of the crosslinkable silicone rubber composition from a mixing nozzle. The 3D printing is optionally assisted by a second mixing nozzle for extrusion of a thermoplastic material which serves as a support material for the silicone rubber composition to be printed. The crosslinking of the silicone rubber composition is effected by platinum-catalyzed addition reaction at room temperature (hydrosilylation). A disadvantage of this process is the unachievable spatially exact positioning of ultrasmall silicone rubber compositions for the printing of fine details. Furthermore, it is no longer possible to influence the juncture of crosslinking after the mixing of the two rubber components, one disadvantage of which is that, in the course of the printing operation, regions of the silicone rubber composition having very different degrees of crosslinking are brought into contact (when the processing time for the rubber composition is shorter than the printing time), or that the printed structure is not self-supporting (processing time longer than printing time).

A specific embodiment of the additive manufacturing method is that of ballistic methods which feature location-selective application of the crosslinkable composition with the aid of a printhead in the form of individual droplets (voxels) (jetting; inkjet printing). The composition applied can subsequently be crosslinked, for example by means of electromagnetic radiation, which forms a thin layer of the molding. This operation of layer-by-layer buildup is repeated until the complete shaped body has been formed.

In the case of the ballistic methods (jetting), a basic distinction is drawn between continuous inkjet (CIJ) printing and drop-on-demand (DOD) inkjet printing. Both methods can generate droplets having diameters of 10 μm up to a few hundred μm.

In the CIJ method, a continuous stream of droplets is generated by expulsion of the material from a nozzle under high pressure and breakdown of the resultant liquid jet to individual droplets as a result of Rayleigh instability. The electrostatically charged droplets are directed by means of electrical deflecting plates such that they either arrive at a precise location on the working plane (substrate) or (if there is to be no printing) arrive in a return channel through which they can be sent to reuse. This recycling of the material to be printed, in the case of crosslinkable silicone rubber compositions, as well as the contamination risk, has the serious danger of bulk alteration of the rheological properties owing to incipient crosslinking and is therefore impracticable.

By contrast, in the DOD method, droplets are only produced if required, all of which are deposited in a location-selective manner for formation of the molding, either in that a positioning robot exactly positions the jetting nozzle in the x, y, z direction or in that the working plane is moved correspondingly in the x, y, z direction; in principle, both options can also be implemented simultaneously.

DE 10 2011 012 412 A1 and DE 10 2011 012 460 A1 describe an apparatus and a method for stepwise production of 3-D structures with a printhead arrangement having at least two, preferably 50 to 200 printhead nozzles, which enables the location-selective application of optionally multiple photocrosslinkable materials with different photosensitivity, wherein the photocrosslinkable materials can subsequently be consolidated in a location-selective manner by electromagnetic radiation, especially by two-photon or multiphoton processes in the focus region of a laser. The application of the photocrosslinkable materials by means of inkjet printing places specific demands on the viscosity of the photocrosslinkable materials. For instance, the photocrosslinkable materials feature a viscosity of less than 200 mPa·s, especially less than 80 mPa·s, more preferably less than 40 mPa·s. In order to achieve adequate crosslinking of the material applied by means of two- or multiphoton polymerization, photoinitiators matched to the laser wavelength and a polymeric crosslinker component containing photocrosslinkable groups are required, where the photocrosslinkable groups belong to the class of the acrylates, methacrylates, acrylamides, methacrylamides, urethane acrylates, urethane methacrylates, urea acrylates and urea methacrylates. However, the method described is unsuitable for production of moldings consisting of silicone elastomers. Firstly, the photoinitiators, photosensitizers, coinitiators etc. that are used have only sparing solubility in the (nonpolar) silicone compositions, which leads to cloudiness, microphase separation and inhomogeneity. As is well-known, the free-radical curing of silicones functionalized with the aforementioned photocrosslinkable groups has the problem of inhibition caused by oxygen, which considerably lowers the crosslinking rate and results in tacky surfaces. If this effect is counteracted by increasing the function density of acrylate groups, for example, the result is nonelastic, brittle vulcanizates. Finally, the extremely high local photon density which is required for multiphoton polymerization (especially as a result of the low function density of photopolymerizable groups) and is generated by means of pulsed femtosecond lasers causes breakdown reactions (carbonization) in the silicone, which leads to unacceptable discoloration and damage to the material.

In the DOD method, the resolution of structural details of the shaped body to be formed depends in particular on the size of the droplets jetted (voxels) and the spatially exact application thereof. In general, it is possible to generate finer structural details by means of smaller droplets. Since the frequency with which the printhead produces the droplets is limited, the use of smaller droplets will, however, inevitably lead to longer production times for the molding, and so a compromise has to be made in the individual case between dimensional accuracy and production time. However, the size of the droplets, which can be varied within wide limits through suitable design of the printhead, depends to a crucial degree on the rheological properties of the crosslinkable composition. It is generally the case that low-viscosity compositions permit the jetting of smaller droplets with higher frequency, whereas higher-viscosity compositions cause the currently available printheads to rapidly reach their limits.

A more detailed consideration of the DOD method shows that a satisfactory print (i.e. a dimensionally exact elastomer part) is obtained only when the technical parameters of the printhead are compatible with the properties, especially the rheological properties, of the material to be printed. Essential technical parameters of the printhead are the pressure differential between the material reservoir and nozzle outlet, the nozzle diameter, and the time within which the entire amount of a droplet leaves the nozzle (ejection time). Useful printheads especially include (thermal) bubblejet and piezo printheads, particular preference being given to piezo printheads, which are also able to jet higher-viscosity materials, for the printing of elastomer parts. These are commercially available (e.g. printheads from "NORDSON CORP./USA" and "VERMES MICRODISPENSING GMBH/Germany"). These piezo printheads enable a pressure buildup in the kbar range, which means that amounts of liquid in the pl to nl range can be expelled within 1-100 μs through a nozzle having diameters between 50 and 500 μm with a speed of 1-100 m/s. This operation is repeated with a frequency of up to a few hundred Hz. These are typical size ranges, which can differ considerably in the individual case. As well as these technical parameters of the print valves, the rheological properties of the material to be printed are also found to be crucial. Even though the manufacturers of the print valves specify processible viscosities of up to about 2 million mPa·s (at low shear rate), materials of such high viscosity can generally only be jetted in the case of extremely shear-thinning characteristics. Shear-thinning characteristics means that the viscosity of the material decreases with increasing shear rate. Since exceptionally high shear rates between $10^5$ and $10^6$ $s^{-1}$ occur in the nozzle in the case of jetting with piezo printheads, shear-thinning characteristics can bring about a drastic decrease in the viscosity by several orders of magnitude during jetting, and it is only as a result of this that jetting is actually possible. If the shear-thinning characteristics of the high-viscosity material are too low, the energy of the piezo print valve is insufficient to force the material through the nozzle and the printhead becomes blocked. It is important to emphasize that the material does not leave the nozzle as finished droplets; instead, a droplet formation process proceeds. The material leaves the nozzle at first in the form of a laminar jet, with rapid formation of oval thickening (because of the main droplet) at the head end, but this still remains bound to the nozzle outlet via a thinner material thread. Subsequently, various scenarios are possible. If the material thread becomes detached at the nozzle outlet and subsequently combines with the main droplet, the result is a single drop, the speed of which slows considerably owing to the elastic combining process. If, by contrast, the material thread becomes detached both at the nozzle outlet and at the main droplet, elastic contraction can result in formation of a second droplet (satellite). The satellite and main droplet can hit the substrate surface one after another (working plane), but can also still combine during the flight phase to give a single droplet. However, the material thread that has become detached can also narrow at multiple points and ultimately form multiple satellite droplets, all of which can subsequently hit the substrate or can still combine with the main droplet during the flight phase. In order to enable the latter, a particular minimum distance of the nozzle outlet from the working plane is necessary. On the other hand, the position of the droplet at an exact location is adversely affected with increasing time of flight, and therefore, in practice, it is necessary to find an optimal distance between the nozzle and substrate, which is typically in the region of a few millimeters.

If the material thread does not become detached immediately at the nozzle outlet (which is determined to a crucial degree by the interfacial tension that exists between the nozzle material and printing material), the portion of the material thread remaining at the nozzle outlet will contract, resulting in blockage of the nozzle, which leads to failure of the printhead. Considering, moreover, that the movement robot that positions the printhead in the x, y plane continuously traverses the x, y plane (i.e. without stopping at the individual points (x,y)), it becomes understandable that the formation of satellites will inevitably lead to a fuzzy print, since the print nozzle, by the time at which the material thread becomes detached at the nozzle outlet, has already moved further in the direction of the next (x,y) point (typical speeds of the movement unit are between 0.1 and 1 m/s). The droplet that hits the working plane at high speed can likewise behave in different ways. It can be deformed, for example, to give a sphere segment-like, sphere-like or donut-like shape, where the usually circular footprint of this shape has a greater diameter than the nozzle or the droplet as a result of the outward spread of the droplet. The droplet can also form a crown-like shape on impact, which then immediately splashes tiny droplets in the radial direction. This splashing also leads to an unclean print. The positioned droplets, owing to the extremely high shear rate in the nozzle, as a result of slow relaxation, can still have a very low viscosity and spread outward too significantly. On the other hand, excessively rapid relaxation to the high starting viscosity in the presence of a yield point can lead to droplet shapes like a conical hat, having a rough surface for lack of adequate leveling. Shear-thickening rheological characteristics of the droplet can even lead to rebound of the impacted droplet.

It will be apparent to the person skilled in the art from the above, that only through the exact matching of the technical parameters of the printhead with the rheological and interfacial properties of the print material is the production of high-quality molded articles possible. In the case of production of moldings proceeding from silicone rubber compositions by means of ballistic 3D printing methods, there are some additionally complicating boundary conditions. The production of silicone elastomers having good mechanical properties (elongation at break, extensibility, tear propagation resistance etc.) is only possible when a) sufficiently long silicone polymers (i.e. with a sufficiently high degree of polymerization or molecular weight) are used, and b) actively reinforcing fillers (fumed or precipitated silicas, carbon blacks etc.) are simultaneously present in the composition. Both of these lead unavoidably to silicone rubber compositions having relatively high viscosity, which is a barrier to clean droplet formation in jetting. The term "relatively high viscosity" shall be understood here to mean a viscosity range from 1000 to 300,000 mPa·s (in each case at 25° C. and a shear rate of 0.5 s$^{-1}$ by the rheological test method for determination of $\eta_{MP1}$ disclosed in the description). Viscosities of this kind are very high compared to the viscosities of the materials typically processible by the inkjet method (acrylates etc.). By contrast, this viscosity range, within the silicone rubber compositions, is considered to be comparatively low to medium-viscosity. High-viscosity silicone rubber compositions typically have viscosities of about 300,000 mPa·s to 10 kPa·s (in each case at 25° C. and a shear rate of 0.5 s$^{-1}$ by the rheological test method for determination of $\eta_{MP1}$ disclosed in the description). Increasing viscosity makes the rapid detachment of the material thread at the nozzle outlet more difficult, meaning that the main droplet remains connected to the nozzle via the material thread for a comparatively long period, while the printhead permanently moves onward. Secondly, for the rapid formation of a discrete droplet in jetting, a maximum surface tension of the material is necessary. Surface tension always causes minimization of the surface area of a shape, meaning that it aims for a sphere shape, which can prevent satellite formation and splashing, for example. However, the surface tension of silicones is among the lowest in the field of elastomers (even lower surface tensions are possessed only by perfluorinated hydrocarbons). While aqueous printing inks have a high surface tension of about 70 mN/m, the latter is only about 20-25 mN/m in the case of silicone-based printing materials. Because of these disadvantages in terms of viscosity and surface tension, the production of elastomeric shaped bodies from silicone rubber compositions by the DOD jetting method was considered to be non-implementable to date. Indeed, this point of view is also supported by numerous scientific publications. If the materials to be jetted and print valves are characterized by properties crucial to processibility, namely nozzle diameter, expulsion speed, droplet speed, droplet volume, density, surface tension and viscosity at the process shear rate, it is possible to define characteristic dimensionless parameters that describe the interplay of the inertia forces, viscous forces, surface tensions, flow properties, friction forces etc. that occur in jetting. These parameters include, for example, the Reynolds number, the Ohnesorge number, the Weber number and the Z number. Using these numbers, it is possible to infer parameter ranges within which jetting (without satellite formation, splashing, blocking etc.) should be possible (cf., for example, Brian Derby, *Inkjet Printing of Functional and Structural Materials: Fluid Property Requirements, Feature Stability, and Resolution*, Annu. Rev. Mater. Res. 2010. 40:395-414). If the typical properties of silicone rubber compositions are entered into these equations, irrespective of the choice of technical parameters of the printhead, this does not lead to the parameter range necessary for proper jetting, which suggests that jetting of silicone rubber compositions which does not meet the demands of DOD 3D printing should not be possible.

SUMMARY OF THE INVENTION

It is therefore an object of the present invention to provide silicone rubber compositions that meet the demands on processing properties and time for use in ballistic additive methods (3D printing), and hence enable high-quality industrial production of elastomeric shaped bodies.

In extensive tests, it has been found that, surprisingly, this object is achieved by the silicone rubber compositions of the invention, since they have exceptional rheological and interfacial properties and hence enable production of elastomeric moldings by means of 3D printing by the ballistic DOD method (jetting), with which moldings are produced in industrial (i.e. marketable) quality.

DETAILED DESCRIPTION OF THE PREFERRED EMBODIMENTS

Figure 1:
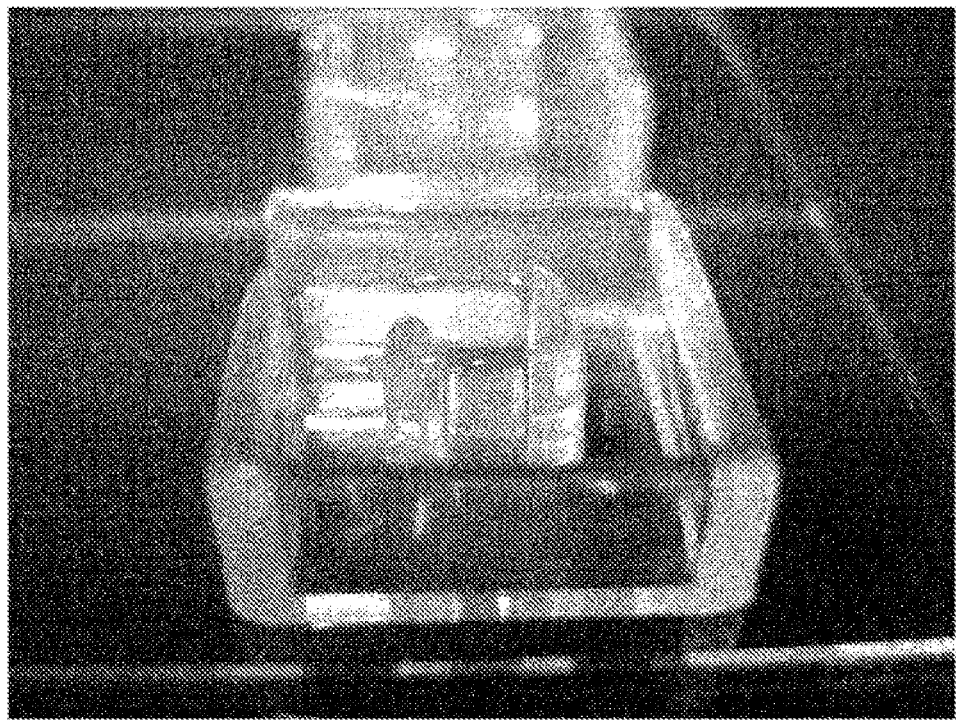
FIG. 1 illustrates one embodiment of a 3-D molding produced in accordance with the invention.

The silicone rubber compositions of the invention for the 3D printing of silicone moldings by the ballistic additive DOD method comprise:
(A) 50% to 95% by weight of at least one organosilicon compound having at least two aliphatically unsaturated groups per molecule,
(B) 1% to 10% by weight of at least one organosilicon compound having at least two SiH groups per molecule,
or, in place of (A)+(B) or in addition to (A) and (B), (G) 0%-95% by weight of at least one organosilicon compound having at least two aliphatically unsaturated groups and at least two SiH groups per molecule,
(C) 0.1 to 500 ppm by weight of at least one hydrosilylation catalyst, based on the content of the metal relative to the overall silicone rubber composition, and
(D) 1% to 50% by weight of at least one actively reinforcing material, in combination with
(E) 0.01% to 2% by weight of a rheological agent which contains polar groups and is selected from (E1), (E2) and (E3) and mixtures thereof
  (E1) epoxy group-functional compounds,
  (E2) (poly)ether group-functional compounds,
  (E3) (poly)ester group-functional compounds,
  where the epoxy and ether and ester groups may also be present in a single molecule, and
(F) 0% to 30% by weight of auxiliaries other than (D) and (E),
characterized in that the relaxation time τ of the silicone rubber composition is within the following range
0 seconds<τ≤10 seconds,
where τ is calculated from formula (III):

$$\eta(t) = \eta_{max} + (\eta_0 - \eta_{max}) * EXP(-t/\tau), \quad (III)$$

where
  $\eta(t)$ is the viscosity at time t,
  $\eta_{max}$ denotes the maximum viscosity attained within a given time after shearing has stopped,
  $\eta_0$ is the viscosity measured immediately after high shear (i.e. at time t=0), and
  EXP means the e function,
with the proviso that the viscosity $\eta_{MP1}$ of the silicone rubber composition comprising all the constituents except for constituent (E) is not more than 300,000 mPa·s,
  where the viscosity measurement for determination of the relaxation time τ and of the viscosity $\eta_{MP1}$ is effected by the rheological test method disclosed in the description.

$\eta_{MP1}$ is preferably at least 1000 mPa·s, more preferably at least 10,000 mPa·s, and most preferably at least 50,000 mPa·s; and at most 300,000 mPa·s, more preferably at most 250,000 mPa·s and most preferably at most 200,000 mPa·s.

Constituent (A) of the silicone rubber compositions of the invention is an organosilicon compound having at least two aliphatic carbon-carbon multiple bonds, preferably linear or branched polyorganosiloxanes composed of units of the formula (I):

$$R_a R^1_b SiO_{(4-a-b)/2} \quad (I)$$

where
R may be the same or different and is a $C_1$-$C_{20}$ radical which is free of aliphatic carbon-carbon multiple bonds, is optionally halogen-substituted and optionally contains oxygen, nitrogen, sulfur or phosphorus atoms,
$R^1$ may be the same or different and is a monovalent, optionally substituted organic radical having an aliphatic carbon-carbon multiple bond,
a is 0, 1, 2 or 3 and
b is 0, 1 or 2,
with the proviso that a+b<4 and there are at least 2 $R^1$ radicals per molecule.

The R radical may comprise mono- or polyvalent radicals, in which case the polyvalent radicals, such as bivalent, trivalent and tetravalent radicals, connect a plurality of, for example two, three or four, siloxy units of the formula (I) to one another.

Preferably, the R radicals are bonded to the silicon via a carbon or oxygen atom. Examples of SiC-bonded R radicals are alkyl radicals (e.g. methyl, ethyl, octyl and octadecyl radicals), cycloalkyl radicals (e.g. cyclopentyl, cyclohexyl and methylcyclohexyl radicals), aryl radicals (e.g. phenyl and naphthyl radicals), alkaryl radicals (e.g. tolyl and xylyl radicals) and aralkyl radicals (e.g. benzyl and beta-phenylethyl radicals). Examples of substituted R radicals are 3,3,3-trifluoro-n-propyl, p-chlorophenyl, chloromethyl, glycidoxypropyl and —$(CH_2)_n$—$(OCH_2CH_2)_m$—$OCH_3$, where n and m are identical or different integers from 0 to 10. Examples of SiO-bonded R radicals are alkoxy groups (e.g. methoxy, ethoxy, iso-propoxy and tert-butoxy radicals) and the p-nitrophenoxy radical.

The $R^1$ radical may be any desired group amenable to an addition reaction (hydrosilylation) with an SiH-functional compound. The $R^1$ radical preferably comprises alkenyl and alkynyl groups having 2 to 16 carbon atoms, such as vinyl, allyl, methallyl, 1-propenyl, 5-hexenyl, ethynyl, butadienyl, hexadienyl, undecenyl, cyclopentenyl, cyclopentadienyl, norbornenyl and styryl radicals, particular preference being given to vinyl, allyl and hexenyl radicals.

If the $R^1$ radical comprises substituted aliphatically unsaturated groups, preferred substituents are halogen atoms, cyano groups and alkoxy groups. Examples of substituted $R^1$ radicals are allyloxypropyl and the isopropenyloxy radical.

Preference is given, as constituent (A), to the use of vinyl-functional, essentially linear polydiorganosiloxanes having a viscosity of 10 to 500,000 mPa·s, more preferably between 100 and 50,000 mPa·s. Constituent (A) may be a mixture of different organosilicon compounds of the type described above.

The content of constituent (A) in the silicone rubber composition of the invention is 50% to 95% by weight, preferably 70% to 90% by weight, more preferably 65% to 80% by weight.

Constituent (B) is any SiH-functional organosilicon compound having an average of at least two SiH groups. Constituent (B) functions as crosslinker of the silicone rubber composition. Constituent (B) may also be a mixture of various SiH-functional organosilicon compounds. Preferably, constituent (B) is linear, cyclic, branched or resinous polyorganosiloxanes having Si-bonded hydrogen atoms, composed of units of the formula (II)

$$R_c H_d SiO_{(4-c-d)/2} \qquad (II)$$

where
R may be the same or different and has the definition given above,
c is 0, 1, 2 or 3 and
d is 0, 1 or 2,
with the proviso that the sum total of (c+d) is not more than 3 and there is an average of at least two Si-bonded hydrogen atoms per molecule.

Preferably, constituent (B) contains Si-bonded hydrogen in the range from 0.04 to 1.7 percent by weight (% by weight) based on the total weight of the organopolysiloxane (B). The molecular weight of constituent (B) may vary within wide limits, for instance between $10^2$ and $10^6$ g/mol. For example, constituent (B) may be an SiH-functional oligosiloxane of relatively low molecular weight, such as tetramethyldisiloxane, but may also be high-polymeric polydimethylsiloxane having SiH groups in chain or terminal positions or a silicone resin having SiH groups. Preference is given to the use of SiH-functional compounds of low molecular weight, such as tetrakis(dimethyl-siloxy)silane and tetramethylcyclotetrasiloxane, SiH-containing siloxanes, such as poly(hydrogenmethyl)siloxane and poly(dimethylhydrogenmethyl)siloxane having a viscosity of 10 to 1000 mPa·s (at 25° C. and 0.8 sec$^{-1}$). Preference is given to constituents (B) that are compatible with constituent (A) (homogeneously miscible or at least emulsifiable). According to the type of constituent (A), it may therefore be necessary to suitably substitute constituent (B), for example by replacing some of the methyl groups with 3,3,3-trifluoropropyl or phenyl groups.

Constituent (B) may be used individually or in the form of a mixture of at least two different constituents (B) and is preferably present in the silicone rubber composition of the invention in such an amount that the molar ratio of SiH groups to aliphatically unsaturated groups is 0.1 to 20, preferably between 0.5 and 5, more preferably between 1 and 3. The content of constituent (B) in the silicone rubber composition of the invention is 0.1 to 15% by weight, preferably 0.5%-10% by weight, more preferably 2%-5% by weight.

Constituent (G) can be used in place of (A)+(B) or in addition to (A) and (B). In the addition-crosslinking compositions of the invention, the following combinations are thus possible: (A)+(B) or (A)+(G) or (B)+(G) or (A)+(B)+(G) or (G) alone. (G) is an organosilicon compound having at least two aliphatically unsaturated groups and at least two SiH groups per molecule and can thus crosslink with itself. Compounds (G) are common knowledge to those skilled in the art from the prior art. If compounds (G) are used, they are preferably those composed of units of the general formulae

$$R^7_k SiO_{(4-k)/2} \qquad (VI),$$

$$R^7_m R^6 SiO_{(3-m)/2} \qquad (VII) \text{ and}$$

$$R^7_o H SiO_{(3-o)/2} \qquad (VIII),$$

where
$R^7$ is a monovalent, optionally substituted hydrocarbyl radical which is free of aliphatic carbon-carbon multiple bonds and has 1 to 18 carbon atoms per radical and
$R^6$ is a monovalent hydrocarbyl radical having a terminal aliphatic carbon-carbon multiple bond having 2 to 8 carbon atoms per radical,
k is 0, 1, 2 or 3,
m is 0, 1 or 2,
o is 0, 1 or 2,
with the proviso that, in (G), there is an average of at least 2 $R^8$ radicals and simultaneously an average of at least 2 Si-bonded hydrogen atoms.

It is possible to use a single compound (G) or a mixture of at least two compounds (G).

The content of constituent (G) in the silicone rubber composition of the invention is 0%-95% by weight, preferably 0%-50% by weight, more preferably 0%-10% by weight.

Constituent (C) serves as catalyst for the addition reaction (hydrosilylation) between the aliphatically unsaturated groups of constituent (A) and the silicon-bonded hydrogen atoms of constituent (B) or (G). In principle, it is possible to use any hydrosilylation catalysts typically used in addition-crosslinking silicone rubber compositions. Catalysts (C) that promote addition of Si-bonded hydrogen onto aliphatic multiple bonds are, for example, platinum, rhodium, ruthenium, palladium, osmium or iridium, an organometallic compound or a combination thereof. Examples of such catalysts (C) are metallic and finely divided platinum which may be present on supports, such as silicon dioxide, aluminum oxide or activated carbon, compounds or complexes of platinum, such as platinum halides, e.g. $PtCl_4$, $H_2PtCl_6 \cdot 6H_2O$, $Na_2PtCl_4 \cdot 4H_2O$, platinum acetylacetonate and complexes of said compounds, encapsulated in a matrix or a core/shell-like structure, platinum-olefin complexes, platinum-phosphite complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, such as platinum-1,3-divinyl-1,1,3,3-tetramethyldisiloxane complexes with or without a content of detectable inorganically bound halogen, bis(gamma-picoline)-platinum dichloride, trimethylenedipyridineplatinum dichloride, dicyclopentadieneplatinum dichloride, dimethylsulfoxide-ethyleneplatinum(II) dichloride, cyclooctadieneplatinum dichloride, norbornadieneplatinum dichloride, gamma-picoline-platinum dichloride, cyclopentadieneplatinum dichloride, and reaction products of platinum tetrachloride with olefin and primary amine or secondary amine or primary and secondary amine, such as the reaction product of platinum tetrachloride dissolved in 1-octene with sec-butylamine or ammonium-platinum complexes, trimethylcyclopentadienylplatinum(IV), trimethyl[(3-trimethoxysily)propylcyclopentadienyl]platinum(IV).

The hydrosilylation catalysts listed generally enable rapid crosslinking of the silicone rubber composition even at room temperature. Since the hydrosilylation reaction sets in immediately after mixing of all constituents, addition-crosslinking compositions are usually formulated in the form of at least two components, where a component A comprises the platinum catalyst (C) and another component B comprises the crosslinker (B) or (G). In order to have a sufficient processing time even after mixing of the two components, inhibitors which delay the onset of the crosslinking reaction are usually added. Rapid crosslinking can then be brought about by supply of heat. For the use of addition-crosslinking compositions in the 3D printing method, however, preference is given to those hydrosilylation catalysts which can barely be activated by thermal means but can be very readily activated by high-energy radiation (UV, UV-VIS), meaning that the deposited silicone rubber composition is crosslinked not with thermal initiation but preferably with initiation by UV or UV-VIS radiation. This is effected, for example, either via an activatable hydrosilylation catalyst or via a deactivatable inhibitor (F) which is additionally present. Compared to thermal crosslinking, UV- or UV-VIS-induced crosslinking has numerous advantages. Firstly, the intensity, period of action and locus of action of the UV radiation can be judged accurately, whereas the heating of the silicone rubber composition deposited dropwise (and the subsequent cooling thereof) is always retarded by virtue of the relatively low thermal conductivity. Because of the intrinsically very high coefficient of thermal expansion of the silicones, the temperature gradients that are inevitably present in the course of thermal crosslinking lead to mechanical stresses which have an adverse effect on the dimensional accuracy of the molding formed, which in the extreme case can lead to unacceptable distortions of shape. A further advantage of the UV/VIS-induced addition crosslinking is found in the production of multicomponent moldings, for example hard-soft composites which, as well as the silicone elastomer, comprise a thermoplastic, the thermal warpage of which is avoided.

UV/VIS-induced addition-crosslinking silicone rubber compositions are known in general terms to those skilled in the art and are described, for example in DE 10 2008 000 156 A1, DE 10 2008 043 316 A1, DE 10 2009 002 231 A1, DE 10 2009 027 486 A1, DE 10 2010 043 149 A1 and WO 2009/027133 A2. The crosslinking takes place through UV/VIS-induced activation of a light-sensitive hydrosilylation catalyst (C), preference being given to complexes of platinum. The technical literature describes numerous light-activatable platinum catalysts which are largely inactive with exclusion of light and can be converted to platinum catalysts that are active at room temperature by irradiation with light having a wavelength of 250-500 nm. Examples of these are ($\eta$-diolefin) ($\sigma$-aryl) platinum complexes (EP 0 122 008 A1; EP 0 561 919 B1), Pt(II)-$\beta$-diketonate complexes (EP 0 398 701 B1) and ($\eta^5$-cyclopenta-dienyl)tri($\sigma$-alkyl) platinum(IV) complexes (EP 0 146 307 B1, EP 0 358 452 B1, EP 0 561 893 B1). Particular preference is given to MeCpPtMe$_3$ and the complexes that derive therefrom through substitution of the groups present on the platinum, as described, for example, in EP 1 050 538 B1 and EP 1 803 728 B1.

The compositions which crosslink in a UV- or UV-VIS-induced manner can be formulated in single- or multicomponent form.

The rate of UV/VIS-induced addition crosslinking depends on numerous factors, especially on the nature and concentration of the platinum catalyst, on the intensity, wavelength and action time of the UV/VIS radiation, the transparency, reflectivity, layer thickness and composition of the silicone rubber composition, and the temperature. For the activation of the UV/VIS-induced addition-crosslinking silicone rubber composition, light of wavelength 240-500 nm, preferably 300-450 nm, more preferably 350-400 nm, is used. In order to achieve rapid crosslinking, which is understood to mean a crosslinking time at room temperature of less than 20 min, preferably less than 10 min, more preferably less than 1 min, it is advisable to use a UV/VIS radiation source with a power between 10 mW/cm$^2$ and 15,000 mW/cm$^2$, and a radiation dose between 150 mJ/cm$^2$ and 20,000 mJ/cm$^2$, preferably between 500 mJ/cm$^2$ and 10,000 mJ/cm$^2$. Within the scope of these power and dose values, it is possible to achieve area-specific irradiation times between a maximum of 2000 s/cm$^2$ and a minimum of 8 ms/cm$^2$. It is also possible to use two or more radiation sources, including different radiation sources.

The hydrosilylation catalyst should preferably be used in a catalytically sufficient amount, such that sufficiently rapid crosslinking is enabled at room temperature. Typically, 0.1 to 500 ppm by weight of the catalyst is used, based on the content of the metal relative to the overall silicone rubber composition, preferably 0.5-200 ppm by weight, more preferably 1-50 ppm by weight. It is also possible to use mixtures of different hydrosilylation catalysts.

Constituent (D)

The term "actively reinforcing material" or, synonymously, "reinforcing material" is understood in the context of this invention to mean an (actively) reinforcing filler. Compared to (inactive) non-reinforcing fillers, actively reinforcing fillers improve the mechanical properties of the elastomers in which they are used. Inactive fillers, by contrast, act as extenders and dilute the elastomer. The terms "actively reinforcing material", "actively reinforcing filler", "reinforcing material" and "reinforcing filler" are used synonymously in the context of the present invention.

Constituent (D) is necessary in order to achieve adequate mechanical strength of the silicone elastomer. Mechanical strength is understood to mean the entirety of the properties typical of elastomers, especially hardness, elongation at break, tear resistance and tear propagation resistance. In order to achieve appealing properties in this regard, the addition of actively reinforcing materials is indispensable. These include, in particular, (D1) finely divided particulate materials such as fumed or precipitated silicas, titanium dioxides, aluminum oxides, precipitated silicas, aerogels and carbon blacks having a high specific surface area between 50 and 1000 m$^2$/g (measured by the BET method to DIN 66131 and DIN 66132), (D2) nanoparticles (for example SiO$_2$, TiO$_2$, exfoliated sheet silicates, carbon nanotubes etc.).

Preference is given to using (D1) as reinforcing filler. A particularly active and preferred reinforcing agent (D1) is fumed silica (produced, for example, by reaction of silicon-halogen compounds in a hydrogen-oxygen flame), or precipitated silica.

Fumed silica is hydrophilic because of the silanol groups (—SiOH) present on the surface thereof. However, it is customary and preferable to use hydrophobic silicas in silicone rubber compositions in order to achieve higher filler contents (and hence better mechanical properties) without an excessive rise in viscosity and without phase inversion. Moreover, the mixing of the silicone constituents and the silica is significantly facilitated by the hydrophobic character. The hydrophobization of the silica, which is effected mainly by silylation, is known to those skilled in the art and is described, for example, in published specifications EP 686676 B1, EP 1433749 A1 and DE 102013226494 A1. As a result of the hydrophobization (silylation) of the silica surface, there is a reduction in the silanol group density typically from 1.8 to 2.5 SiOH/nm$^2$ down to less than 1.8 to less than 0.9 silanol groups per nm$^2$ (determined by means of acid-base titration as stated in G. W. Sears, Anal. Chem. 1956, 26, 1981). At the same time, there is an increase in the carbon content of the silica to 0.4% to 15% by weight of carbon (determined by means of elemental analysis), the weight being based on the hydrophobic silica.

The use of reinforcing agents (D2) is possible but not preferred, because it is impracticable on the industrial scale. Because of the very minor intermolecular interactions between silicones, the production of true nanoparticulate silicone rubber compositions is found to be very difficult. There is usually rapid re-agglomeration of the nanoparticles, or there is no exfoliation or intercalation of sheet silicates in the silicone.

It is also possible to use a plurality of different reinforcing agents (D).

The content of reinforcing agents (D) based on the overall crosslinkable silicone rubber composition is between 1% and 50% by weight, preferably between 5% and 30% by weight, more preferably between 10% and 25% by weight.

Constituent (E) of the silicone rubber composition of the invention is a rheological agent which serves to adjust the shear-thinning and thixotropic characteristics. Shear-thinning characteristics are understood here to mean the decrease in the viscosity with increasing shear rate. Thixotropic characteristics are the level and speed of the recovery in viscosity with which the material attempts to return to the original state of viscosity after the shearing has stopped. Shear-thinning, structurally viscous characteristics are caused in particular by at least partly reversible changes in structure in the material as a result of the shear forces. For example, physical particle-particle networks can be broken up by shear forces, as a result of which the polymer that was previously immobilized in this network becomes free-flowing and the viscosity of the material falls. At rest, this network can often be reformed again (thixotropic characteristics).

For a high-quality print, constituent (E) is of crucial significance in the ballistic deposition of silicone rubber compositions. Constituent (E) brings about a sufficiently rapid increase in the viscosity of the deposited droplet and hence prevents excessive spreading and splashing. Moreover, constituent (E) causes a yield point, as a result of which the deposited silicone rubber composition gains adequate green strength that enables the printing of fine structural details and, to a certain degree, makes it possible to dispense with the additional deposition of support structures.

The addition of constituent (E) to noninventive (E)-free Silicone rubber compositions on which the silicone rubber composition of the invention is based, brings about a considerable rise in the viscosity at rest $\eta_{MP1}$ of the material, such that the silicone rubber compositions of the invention have viscosities of well above 300,000 mPa·s, in some cases above 1 kPa·s (measured by the rheological test method disclosed in the description). In spite of this considerable rise in viscosity, the silicone rubber compositions of the invention that comprise constituent (E) can be jetted without any problem and lead to a clean print. The former is as a result of the shear-thinning effect of (E), the latter as a result of the shortening of the relaxation time of the jetted droplet by (E).

The efficacy of the rheological agent (E) is tied to the presence of constituent (D). Although constituent (D) even without constituent (E) can already cause a certain degree of shear-thinning and thixotropic characteristics, it is only the combination with (E) that leads to a sufficient degree of shear thinning and thixotropy, which is required for the jetting and spatially exact deposition of the silicone rubber composition. Since the (particulate) constituents (D) dispersed in the silicone rubber composition interact with the silicone constituents (A) and (B) and (G) principally via weak physical interactions (e.g. LONDON forces), only a weak network is formed by the particle-silicone-particle interactions, which can easily be destroyed by shearing (shear-thinning), but even in the subsequent state of rest returns only very gradually to the original viscosity, which ultimately leads to diffluence of the deposited droplet and hence to an unclean print. By contrast, constituent (E) is an agent which contains polar groups and forms much stronger physical interactions with the particles of constituent (D), the result of which is that the particle-(E)-particle bonds are stronger (higher viscosity at rest, higher yield point), stronger shear dilution occurs, and, in particular, there is much faster restoration of the viscosity at rest, meaning that the droplet deposited at a selected location can spread only marginally into the environment. This effect of constituent (E) relative to constituent (D) in the silicone rubber composition of the invention can be characterized and quantified by means of what is called the relaxation time t, where i is calculated from formula (III):

$$\eta(t)=\eta_{max}+(\eta_0-\eta_{max})*\mathrm{EXP}(-t/\tau), \qquad (III)$$

where $\eta(t)$ is the viscosity at time t,
$\eta_{max}$ is the maximum viscosity attained within a given time after shearing has stopped,
$\eta_0$ is the viscosity measured immediately after high shear (i.e. at time t=0) and
EXP means the e function.

The relaxation time $\tau$ thus defined describes how quickly the viscosity of a material under high shear recovers when the shearing is stopped. Large values $\tau$ result in a slow recovery of viscosity, small values result in rapid relaxation. In extensive tests using different silicone rubber compositions, it has been found that the only silicone rubber compositions that lead to a clean print are those whose relaxation time $\tau$ is not more than 10 seconds, preferably not more than 7 seconds, more preferably not more than 5 seconds. It is found that noninventive silicone rubber compositions with relaxation times of >10 seconds always lead to an unclean print (for example inadequate edge sharpness, blurred structural details etc.). It will be clear to the person skilled in the art that, for physical reasons, the relaxation time $\tau$ has to be >0. Extremely short relaxation times (close to 0) are additionally usually undesirable since, in this case, the viscosity of the deposited droplet builds up so quickly that leveling (rounding) of the droplets is no longer possible, which can result, for example, in conical droplets and ultimately rough surfaces. Under some circumstances, however, this effect can actually be desired (for example in order to generate matt surfaces).

The effect of constituent (E) on the relaxation time τ of the silicone rubber composition is dependent in particular on the chemical composition of (E), the content of (E) and the nature and content of the reinforcing agents (D). However, excessively high proportions of (E) have adverse effects on other properties of the silicone rubber composition or of the shaped body obtainable therefrom. Therefore, (E) may be present in the silicone rubber composition to a maximum extent of 2% by weight (based on the overall silicone rubber composition) and must achieve a relaxation time τ of not more than 10 seconds. Preferably, (E) is present in a maximum amount of 1% by weight, more preferably in a maximum amount of 0.5% by weight. Rheological additives (E) of the invention are preferably selected from the following group:
- (E1) epoxy group-functional compounds,
- (E2) (poly)ether group-functional compounds and
- (E3) (poly)ester group-functional compounds, where the epoxy and ether and ester groups may also be present in a single molecule. The term "functional" relates to a stronger interaction between the relevant group from (E) and constituent (D) compared to the interaction between silicone and (D). This stronger interaction particularly includes hydrogen bonding interactions and polar interactions of the Debye and Keesom type. The enhanced interaction of (E) with (D) brings about the formation of physical (D)-(E)-(D) bridges, which leads to formation of a network-like structure of the silicone rubber composition, which reduces the flowability of the silicone constituents (A) and (B) and, if present, (G) (yield point, high viscosity at rest). Under shear, this network is destructured, recognizable by significant shear-thinning. After the shearing has stopped, the stronger interaction of the rheological agent (E) with (D) causes the rapid restoration of the network structure, associated with an increase in viscosity and formation of a yield point.

The mode of action of the constituents (D) and (E) is to be elucidated hereinafter, and a way in which the relaxation time τ and the viscosity at rest $\eta_{MP1}$ can be controlled will be shown.

As already mentioned, the efficacy of constituent (E) is tied to the presence of constituent (D). (D) is a reinforcing filler necessary for the achievement of adequate mechanical strength of the crosslinked silicone composition. Typically and preferably, finely divided silicas are used for this purpose.

The reinforcing filler (D) consists of primary particles two-dimensionally fused to one another via covalent bonds, called aggregates, which are in turn assembled via physical interactions (hydrogen bonds, van der Waals interactions) to form agglomerates. While the aggregates remain structurally conserved when mixing with the silicone, the physical interactions that lead to the agglomerates can be overcome, the ultimate effect of which is that the agglomerates are broken up and the aggregates are in fine distribution (dispersion) in the silicone matrix.

The reinforcing filler (D) typically has a high surface energy. In the case of hydrophilic silicas, for example, as a result of the numerous silanol groups present on the surface, the surface energy is about 70 mJ/m². The high surface energy opposes good dispersion of the aggregates in the silicone by virtue of the relatively strong aggregate-aggregate interactions, the result of which is that, on mixing, at first, only the agglomerates are wetted with the silicone without breaking these up to form isolated aggregates.

The high surface energy of the filler additionally results in relatively strong interactions with the silicone constituents, such that the latter are immobilized on the filler surface, which reduces their mobility, which results in a rise in viscosity of the silicone composition.

The high surface energy, for example in the case of hydrophilic silica, can be weakened by hydrophobization, meaning that the hydrophilic silanol groups on the surface of the silica are converted to hydrophobic organic groups or covered with hydrophobic polymers etc. The hydrophobic silicas produced in this way have a significantly lower surface energy (about 30 mJ/m²), which results in significantly weaker particle-particle and particle-polymer interactions. The use of hydrophobic fillers in silicone compositions therefore enables good dispersion of the aggregates and restriction of the rise in viscosity resulting from the filler content.

A crucial factor for the balance between the particle-particle and particle-polymer interactions is the surface energies and interfacial energies of the materials involved. In thermodynamic terms, a system consisting of two materials "1" and "2" will attempt to minimize its surface energy $\gamma_{12}$. The surface energy (also referred to as surface tension) is that energy needed to increase the surface area of the material by one area unit in a vacuum. The interfacial energy (also referred to as interfacial tension) is that energy needed to increase the interfacial area between two materials by one unit of area. This interfacial energy is related to the surface energies of the two materials, $\gamma_1$ and $\gamma_2$, as follows:

$$\gamma_{12} = \gamma_1 + \gamma_2 - W_{12} \tag{IX}$$

where $W_{12}$ is the free work of adhesion that has to be expended in order to fully separate a contact face of the two materials of the magnitude of one area unit in a vacuum. It follows from this that, firstly, more intense interactions between the materials 1 and 2 reduce the interfacial energy thereof. Secondly, the contact of materials having lower surface energy likewise leads to a lower interfacial energy.

If the contact of the two materials 1 and 2 does not take place in a vacuum but in a medium "3", it can be shown that the free work of adhesion to be expended for separation of the two materials, $W_{132}$, is given by the following equation (cf. J. N. Israelachvili, Intermolecular and Surface Forces, 3th Edition, Academic Press, 2011):

$$W_{132} = \gamma_{13} + \gamma_{23} - \gamma_{12}. \tag{X}$$

If this work of adhesion is high (positive), contact between the two materials 1 and 2 in the medium 3 is favored; if it is low (negative), the system aims for separation of the materials 1 and 2 in the medium 3 for thermodynamic reasons.

If the materials 1 and 2 are identified as two filler aggregates and material 3 as the silicone matrix, the equation (X) shows a distinctly positive work of adhesion which favors the formation of a filler network in the silicone matrix via physical interactions, meaning that a filler network is formed in the silicone matrix in the course of establishment of the thermodynamic equilibrium. This physical filler network brings about a reduction in the mobility of the polymer chains present in this network, which is associated with a considerable rise in viscosity.

Since the weak physical interactions that act between the silica aggregates can be overcome by shear forces, the filler network collapses under intensive shear, which abruptly increases the mobility of the polymer chains and results in a correspondingly significant decrease in viscosity. Reference is therefore made to shear-thinning or structurally viscous (or else thixotropic) characteristics.

If the shearing of such a silicone composition is stopped, the system returns to the original equilibrium state (relaxation), meaning that the filler network is built up again and the viscosity constantly increases until its original value is attained. The speed of relaxation to the original state can be characterized by the relaxation time $\tau$.

The higher the value of the work of adhesion $W_{131}$, the stronger the thermodynamic driving force for formation of the filler network, which is generally associated with very rapid formation of the filler network. If the value of the work of adhesion $W_{131}$ is positive but very small, the filler network is built up very gradually in the establishment of equilibrium and can take a period of months to years, for example.

The rheological additive (E) is capable of raising the surface energy of the dispersed filler. For example, 3-glycidoxypropyltrimethoxysilane has a surface energy of 38.5 mJ/m$^2$ and is thus higher than that of the abovementioned hydrophobic silica surface.

The compounds listed as additive classes (E1), (E2) and (E3) are adsorbed on the filler surface, where they increase the surface energy thereof and in this way increase the thermodynamic driving force for formation of a physical filler network and hence cause shear-thinning characteristics.

These compounds are only partly compatible with the markedly hydrophobic silicone matrix. The polarity or surface energy of the compounds (E) must not be too high since this could lead to unwanted phase separation (demixing) between silicone and additive.

If the increase in the surface energy of the filler aggregates brought about by the rheology additive (E) is too small, the result is an excessively slow return to the original viscosity (excessively long relaxation time) and excessive diffluence of the deposited droplets of the silicone composition. This results in inadequate trueness to detail in the print. For example, it is not possible to produce sharp edges of the shaped body.

If, by contrast, the increase in the surface energy caused by the rheology additive (E) is too great, excessively short relaxation times for the higher-viscosity silicone compositions can be the result, meaning that the deposited droplets merge only inadequately into one another prior to the crosslinking, which reduces the mechanical strength of the printed molding (poor laminar adhesion) and/or results in a rough surface (this is generally undesirable, but as the case may be can be utilized in order to produce matt surfaces, for example).

The increase in the surface energy of constituent (D) achieved by the additive (E) depends on two factors in particular: the surface energy of the additive (E) and the concentration of (E) in the silicone composition. Within certain limits, therefore, low concentrations of higher-energy additives (E) can bring about the same effect as higher concentrations of lower-energy additives.

However, the filler surface has a saturation limit for the adsorption of the additive (E), such that an excessive increase in the concentration of (E) is inadvisable. This saturation limit may in turn be dependent on the nature of the additive (molecular weight, number of polar groups in the molecule etc.).

It will be appreciated that the increase in viscosity of the (E)-free silicone composition which is caused by the addition of (E) also depends on the surface energy and the concentration of the additive (E), but additionally also on the original viscosity of the (E)-free material, which is determined essentially by the content and hydrophobicity of the filler and by the polymer chain length of the silicone constituents.

If the viscosity at rest of the (E)-free silicone composition is found to be too high, i.e. above 300,000 mPas, this can be counteracted by (i) lowering the filler concentration, (ii) increasing the hydrophobicity of the filler, and/or (iii) lowering the polymer chain length of the silicone constituents. The exact adjustment of the viscosity at rest $\eta_{MP1}$ can thus be achieved via simple routine experiments.

As already mentioned, the viscosity of the shear-thinning silicone compositions of the invention falls as a result of intensive shearing (for example on passage through the jetting nozzle) to very low values. Given comparable shear-thinning characteristics, those silicone rubber compositions that have a higher viscosity at rest, even after intensive shearing, generally have a higher viscosity than those silicone compositions that have a low shear viscosity at rest. Therefore, the higher-viscosity silicone compositions having relaxation times at the upper end of the range claimed (i.e. having a relatively long relaxation time), can still result in usable prints, whereas silicone compositions having a relatively low viscosity at rest require comparatively short relaxation times in order to achieve good results. These relationships are understandable considering that the restructuring of the filler network in the silicone matrix after shear stress is a dynamic process which is determined by the rate of flow processes.

If the restructuring of the filler network is found to be too slow for DOD-3D printing, this can be counteracted (i) by increasing the surface energy (for example via a lower degree of hydrophobization) and/or (ii) by increasing the concentration of the additive (E). The exact adjustment of the relaxation time $\tau$ can thus be achieved via simple routine experiments.

Constituent (E1) may be any organic or organosilicon compound having at least one epoxy group and is used with preference. Especially preferred are epoxy-functional organic compounds (E1). Examples of organic epoxy-functional compounds (E1) are 1,2-epoxypropanol, vinylcyclohexene monoxide, dodecanol glycidyl ether, butyl glycidyl ether, p-tert-butyl-phenyl glycidyl ether, 2-ethylhexyl glycidyl ether, glycidyl methacrylate, dicyclopentadiene dioxide, vinyl-cyclohexene dioxide, butanediol diglycidyl ether, neopentyl glycol diglycidyl ether, hexane-1,6-diol diglycidyl ether, polypropylene glycol diglycidyl ether, trimethylolpropane triglycidyl ether, 3,4-epoxycyclohexylmethyl 3',4'-epoxycyclohexanecarboxylate. Constituent (E1) may be an epoxidized vegetable oil or vegetable oil containing epoxy groups, such as epoxidized rapeseed oil, sunflower oil, linseed oil, soybean oil, palm oil, crambe oil, castor oil and vernonia oil, or an epoxidized fatty acid, such as epoxidized oleic acid, petroselic acid, erucic acid, linoleic acid, linolenic acid, ricinoleic acid, calendic acid, vernolic acid and santalbinic acid.

Preferred constituents (E1) are organosilicon epoxy-functional compounds composed of units of the formula (IV)

$$R^2_e R^3_f SiO_{(4-e-f)/2} \quad \text{(IV)}$$

where $R^2$ may be the same or different and has the above definition of the R and $R^1$ radicals, $R^3$ is a monovalent hydrocarbyl radical having 2 to 20 carbon atoms that contains at least one epoxy group $CH_2(—O—)CH—$ or $—CH(—O—)CH—$, is optionally halogen-substituted and optionally contains oxygen, nitrogen, sulfur or phosphorus atoms, with the proviso that
e is 0, 1, 2 or 3,
f is 0, 1, 2, 3 or 4,
and (e+f)<5.
Examples of these are epoxy-functional silanes such as 2-(3,4-epoxycyclohexyl)ethyltriethoxysilane, 2-(3,4-epoxycyclohexyl)-ethyltrimethoxysilane, (3-glycidoxypropyl)trimethoxysilane, (3-glycidoxypropyl)triethoxysilane, 5,6-epoxyhexyltriethoxysilane, (3-glycidoxypropyl)methyldimethoxysilane, (3-glycidoxypropyl)methyldiethoxysilane, (3-glycidoxypropyl)dimethylethoxysilane and tris(glycidoxypropyldimethylsiloxy)phenylsilane. Further examples of organosilicon compounds (E1) are epoxy-functional siloxanes such as bis(2-(3,4-epoxycyclohexyl)ethyl)tetramethyldisiloxane, 1,5-bis(glycidoxypropyl)-3-phenyl-1,1,3,5,5-pentamethyltrisiloxane, (3-glycidoxypropyl)bis(trimethyl-siloxy)silane, (3-glycidoxypropyl)pentamethyldisiloxane, 1,3-bis(glycidoxypropyl)tetramethyldisiloxane, glycidoxypropyl-tetramethylcyclotetrasiloxane, glycidoxypropyl-trimethoxy-silylethylpentamethylcyclopentasiloxane, glycidoxypropyl-terminated polydimethylsiloxanes, epoxycyclohexylethyl-terminated polydimethylsiloxanes, copolymeric poly(epoxycyclo-hexylethylmethyl-dimethyl)siloxanes and copolymeric poly(epoxy-cyclohexylethylmethyl-dimethyl-polyalkyleneoxypropylmethyl)-siloxanes.

Constituent (E2) is a (or a mixture of two or more) polyether-functional organic or organosilicon compound(s). Preference is given to polyalkylene glycols of the general formula (V)

$$R^4-(O-CH2-CHR^5)_n-OR^4 \qquad (V)$$

where the radicals are as follows:
$R^4$ may be the same or different and is a monovalent saturated or unsaturated $C_1$-$C_{20}$ hydrocarbyl radical which is optionally halogen-substituted and optionally contains oxygen, sulfur, nitrogen or phosphorus atoms, a hydrogen atom or a monovalent organosilicon radical consisting of units of the formula (I), the $R^5$ radicals may be the same or different and are a hydrogen atom or a $C_1$-$C_4$ hydrocarbyl radical, preferably a hydrogen atom or a methyl radical,
$\eta$ is an integer from 1 to 1000, preferably 1 to 500 and more preferably 5-100.

Preference is given to polyalkylene glycols having a melting point less than 100° C., preferably less than 50° C., particular preference to polyalkylene glycols that are liquid at room temperature (23° C.). The number average molecular weight of preferred polyalkylene glycols is between 200 and 10,000 g/mol.

Preference is given to polyethylene glycols having a number-average molecular weight of 200 g/mol (PEG 200), about 400 g/mol (PEG 400), about 600 g/mol (PEG 600), about 1000 g/mol (PEG 1000).

Preference is given to polypropylene glycols having a number-average molecular weight of about 425 g/mol, about 725 g/mol, about 1000 g/mol, about 2000 g/mol, about 2700 g/mol and 3500 g/mol.

Preference is given to block copolymers of polyethylene glycol (PEG) and polypropylene glycol (PPG) of the PEG-PPG and PEG-PPG-PEG type, e.g. poly(ethylene glycol)-block-poly (propylene glycol)-block-poly(ethylene glycol), preferably with a PEG content of >10% by weight, more preferably with a PEG content of >30% by weight.

Preference is given to polyalkylene glycol-functional silanes and siloxanes. Examples of silanes are bis((3-methyl-dimethoxysilyl)propyl)polypropylene oxide, 1,3-(bis(3-triethoxysilylpropyl)polyethyleneoxy)-2-methylenepropane, bis(3-triethoxysilylpropyl)polyethylene oxide with 25-30 EO units, 2-(methoxy(polyethyleneoxy)$_{6-9}$propyl)dimethylmethoxysilane, 2-(methoxy(polyethyleneoxy)$_{6-9}$propyl)trimethoxysilane, methoxy-triethyleneoxyundecyltrimethoxysilane and bis(3-(triethoxysilylpropyl)-2-hydroxypropoxy)polyethylene oxide. Examples of polyalkylene-glycol-functional siloxanes are block and graft copolymers consisting of dimethylsiloxane units and ethylene glycol units.

Constituent (E3) is a (or a mixture of two or more in each case) polyester-functional compound(s) or a (or a mixture of two or more in each case) carbonic acid-functional compound(s) which may be liquid/amorphous or crystalline. The compounds may be linear or branched.

Preference is given to polyester-functional or carbonic acid-functional compounds having a melting point less than 100° C., preferably less than 50° C., particular preference being given to polyester-functional or carboxylic ester-functional compounds that are liquid at room temperature (23° C.).

The number average molecular weight of preferred polyester functional or carbonic ester-functional compounds is between 200 and 2500 g/mol.

Liquid compounds are preferred. Also possible are mixtures of two or more compounds from the two compound classes.

Suitable polyester-functional compounds are, for example, polyester polyols which can be prepared, for example, from dicarboxylic acids having 2 to 12 carbon atoms, preferably 4 to 6 carbon atoms, and polyhydric alcohols. OH-functional polyesters are common knowledge to those skilled in the art, and they are commercially available. Especially suitable are polyester polyols containing two or three terminal OH groups.

In addition, it is also possible to use condensation products of ω-hydroxycarboxylic acids, for example ω-hydroxycaproic acid and preferably polymerization products of lactones, for example optionally substituted ω-caprolactones.

Suitable carbonic ester-functional compounds are, for example, polycarbonate polyols and polycarbonate-polyester polyols.

It is also possible to use block copolymers from the compound classes mentioned and mixtures of the above-mentioned compounds.
Examples of Polyhydric Alcohols
Examples of polyhydric alcohols are glycols having 2 to 10 and preferably 2 to 6 carbon atoms, for example ethylene glycol, diethylene glycol, polyethylene glycol, dipropylene glycol, polypropylene glycol, dibutylene glycol and polybutylene glycol, butane-1,4-diol, pentane-1,5-diol, hexane-1,6-diol, decane-1,10-diol, 2,2-dimethylpropane-1,3-diol, 2-methyl-propane-1,3-diol, propane-1,3-diol and dipropylene glycol, 1,4-hydroxymethylcyclohexane, butane-1,2,4-triol, triethylene glycol, and tetraethylene glycol.

According to the desired properties, the polyhydric alcohols can be used alone or, if appropriate, in a mixture with one another.
Examples of Dicarboxylic Acids
Examples of useful dicarboxylic acids include: aliphatic dicarboxylic acids such as succinic acid, glutaric acid, adipic acid, suberic acid, azelaic acid and sebacic acid, and aromatic dicarboxylic acids such as phthalic acid, isophthalic acid and terephthalic acid. The dicarboxylic acids can be used individually or as mixtures, for example in the form of a succinic acid, glutaric acid and adipic acid mixture.

Examples of Carbonic Acid Derivatives

Suitable examples are esters of carbonic acid with the abovementioned polyhydric alcohols/diols, especially those having 4 to 6 carbon atoms, such as butane-1,4-diol and/or hexane-1,6-diol.

Examples of Polyester Diols

Polyester diols used are preferably ethanediol polyadipate, butane-1,4-diol polyadipate, ethanediol butane-1,4-diol polyadipate, hexane-1,6-diol neopentyl glycol polyadipate, hexane-1,6-diol butane-1,4-diol polyadipate and polycaprolactones.

The content of (E) in the silicone rubber composition of the invention is 0.01%-2% by weight, preferably 0.05%-1% by weight, more preferably 0.1%-0.5% by weight.

In order to display an adequate shear-thinning and thixotropic effect, the polar groups (epoxy and ether and ester groups) present in constituent (E) have to be in a particular ratio relative to the content of constituent (D) in the silicone rubber composition of the invention. According to the invention, the content of (E) in relation to (D) is such that, for every one gram of constituent (D), there is at least 0.1 µmol and at most 100 mmol of polar groups of constituent (E), preferably between 1 µmol to 10 mmol and more preferably 0.01 mmol to 1 mmol.

Preference is given to using (D1) in combination with (E1). Particular preference is given to the combination of hydrophobic fumed silica as (D1) with epoxy-functional organic compounds (E1).

Constituent (F) is known to those skilled in the art and includes all optional additives that may be present in the silicone rubber composition of the invention in order to achieve specific profiles of properties. These include inhibitors, heat stabilizers, solvents, plasticizers, color pigments, sensitizers, photoinitiators, adhesion promoters, inactive fillers, conductivity additives, silicone resins etc. that are different than constituents (A) to (E).

Determination of Viscosity

The viscosities are measured in an Anton Paar MCR 302 rheometer according to DIN EN ISO 3219: 1994 and DIN 53019, using a cone-plate system (CP50-2 cone) with an opening angle of 2°. The instrument was calibrated with 10000 standard oil from the National Metrology Institute of Germany. The management temperature is 25.00° C.+/− 0.05° C., the measurement time 3 min. The viscosity reported is the arithmetic mean of three independently conducted individual measurements. The measurement uncertainty for the dynamic viscosity is 1.5%. The shear rate was chosen depending on the viscosity and is stated separately for each viscosity reported.

Rheological Test Method for Determination of the Viscosity $\eta_{MP1}$ and Relaxation Time $\tau$ of the Silicone Rubber Compositions All measurements were conducted in an Anton Paar MCR 302 rheometer with air bearings at 25° C., unless stated otherwise, according to DIN EN ISO 3219. Measurement was effected with plate-plate geometry (diameter 25 mm) with a gap width of 300 µm. Excess sample material was removed by means of a wooden spatula after the plates had formed the measurement gap (called trimming).

Before the start of the actual measurement profile, the sample was subjected to a defined preliminary shear in order to eliminate the rheological history composed of sample application and formation of the measurement position. This preliminary shear (measurement phase 1) comprises a shear phase of 60 s at a shear rate of 0.5 s$^{-1}$, wherein a viscosity value $\eta_{MP1}$ is established very rapidly and remains constant. Immediately thereafter, there is strong shear at a shear rate of 25 s$^{-1}$ that lasts for 60 s (measurement phase 2), which results in an abrupt drop in the viscosity, as a result of the shear-thinning characteristics, to a very low value that remains constant.

Figure 6:
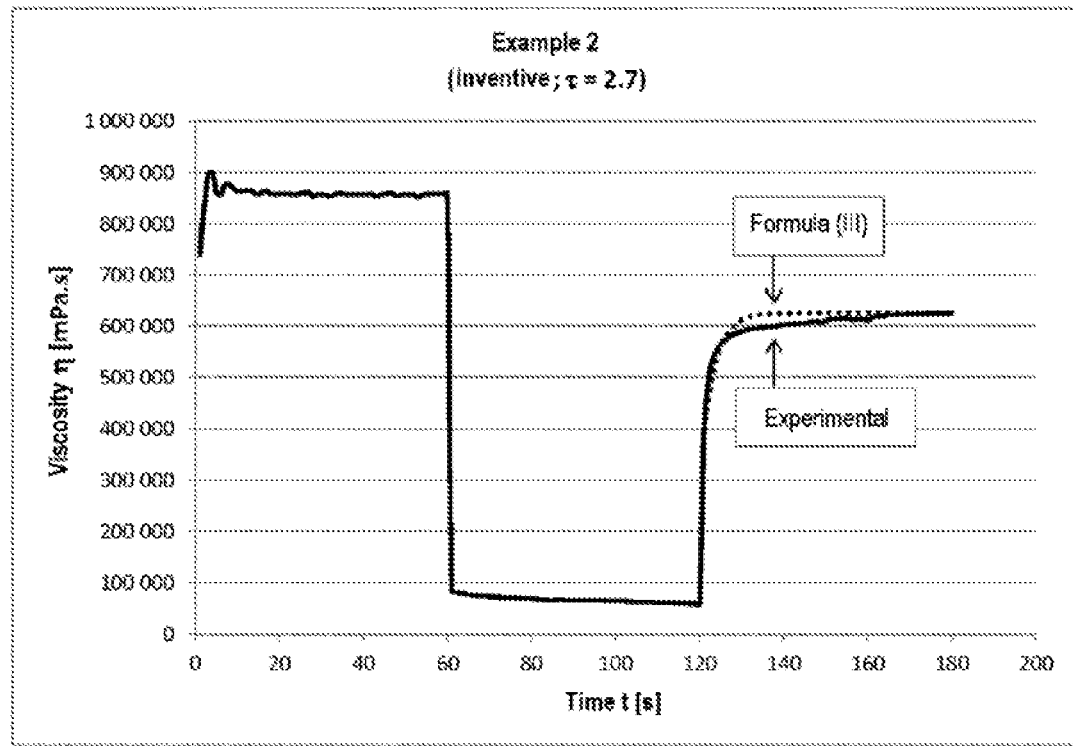
FIG. 6 illustrates a real logical measurement curve of one embodiment of a 3-D-principal cross-linkable silicone composition of the invention.

In the measurement phase 3 that follows immediately, which lasts for 60 s, there is a gentle shearing at 0.5 s$^{-1}$, wherein, according to the relaxation rate, there is initially a rapid increase in viscosity which slows down later on, such that a constant value $\eta_{max}$ is ultimately attained (cf. FIG. 6). The profile of the viscosity η(t) against time during measurement phase 3 was approximated by means of the function according to formula (III)

$$\eta(t)=\eta_{max}+(\eta_0-\eta_{max})*\text{EXP}(-t/\tau) \tag{III}$$

where η(t) is the viscosity at time t, commencing with t=0 immediately at the end of measurement phase 2, $\eta_{max}$ is the maximum viscosity attained in measurement phase 3, $\eta_0$ is the viscosity measured directly at the end of measurement phase 2 (i.e. at time t=0), and EXP means the e function. The relaxation time τ thus defined describes how quickly the viscosity of a strongly sheared material recovers when the shear is (virtually) stopped. In measurement phase 3, 60 measurement points (η,t) were recorded ($\eta_1$, 1), ($\eta_2$, 2), . . . , ($\eta_{60}$, 60) and plotted in an EXCEL® format. The parameter τ that can be freely chosen in formula (III) was determined by minimizing the sum of the squared errors between the experimentally determined viscosity values and the viscosity values calculated by formula (III) by the variation of the parameter τ; in other words, τ was calculated such that the experimentally determined (η,t) values are described as well as possible by the function (III) (in the sense of the smallest sum of the squared errors). The approximation was conducted with the aid of the "Solver" program available in EXCEL®, with the "GRG nonlinear" solving method. It was found that the viscosity relaxation characteristics of the silicone rubber compositions can be described in an excellent manner by means of the formula (III), especially using the parameter τ (relaxation time).

Silicone rubber compositions of the invention can be produced in one-, two- or multicomponent form. In the simplest case, production is effected in the form of a one-component silicone rubber composition of the invention by homogeneous mixing of all components.

The silicone rubber compositions of the invention are used for production of elastomeric shaped bodies by means of ballistic additive 3D printing methods.

The present invention therefore further provides a process for producing elastomeric shaped bodies, characterized in that the shaped bodies are formed from the silicone rubber compositions of the invention by means of ballistic additive DOD methods (3D printing).

EXAMPLES

The examples which follow serve to illustrate the invention without restricting it.

Rheological Test Method

Testing in the examples was effected analogously to the manner described above.

Conditioning of the Silicone Rubber Compositions

All the silicone rubber compositions used for DOD 3D printing were devolatilized prior to processing, by storing 100 g of the composition in an open PE can in a desiccator under a vacuum of 10 mbar at room temperature for 3 h. Subsequently, the composition was dispensed into a 30 ml cartridge having a bayonet seal with exclusion of air and sealed with an appropriate expulsion plunger (plastic piston).

The Luer lock cartridge was then screwed into the vertical cartridge holder of the Vermes dosage valve in a liquid-tight manner with the Luer lock screw connection downward and 3-8 bar compressed air was applied to the pressure plunger at the top end of the cartridge; the expulsion plunger present in the cartridge prevents the compressed air from getting into the previously evacuated silicone rubber composition.

All UV-sensitive silicone compositions were produced under yellow light (with exclusion of light below 700 nm), devolatilized analogously and dispensed into opaque 30 ml cartridges with a Luer lock bayonet seal.

In order to prevent the silicone compositions from absorbing air during storage, the cartridge containers were packed under vacuum with aluminum foil-covered PE inliners using a vacuum welding system from Landig+Lava GmbH & Co. KG, Valentinstraße 35-1, D-88348 Bad Saulgau.

Raw Materials and Silicone Rubber Compositions Used
Vinyl-Functional Polyorganosiloxanes as Per Constituent (A):

R1: vinyldimethylsiloxy-terminal polydimethylsiloxane having a viscosity of 200 cSt., available from ABCR GmbH, Karlsruhe, Germany under the "Poly(dimethylsiloxane), vinyldimethylsiloxy terminated; viscosity 200 cSt." product name, cat. no. AB109357, CAS No. [68083-19-2].

R2: vinyldimethylsiloxy-terminal polydimethylsiloxane having a viscosity of 1000 cSt., available from ABCR GmbH, Karlsruhe, Germany under the "Poly(dimethylsiloxane), vinyldimethylsiloxy terminated; viscosity 1000 cSt." product name, cat. no. AB109358, CAS No. [68083-19-2].

R3: vinyldimethylsiloxy-terminal polydimethylsiloxane having a viscosity of 20,000 cSt., available from ABCR GmbH, Karlsruhe, Germany under the "Poly(dimethylsiloxane), vinyldimethylsiloxy terminated; viscosity 20000 cSt." product name, cat. no. AB128873, CAS [68083-19-2] (ABCR catalog).

SiH-Functional Crosslinkers as Per Constituent (B):

R4a: methylhydrosiloxane-dimethylsiloxane copolymer having a molecular weight of Mn=1900-2000 g/mol and a methylhydrogensiloxy content of 25-30 mol %, available from Gelest, Inc. (65933 Frankfurt am Main, Germany) under the product name HMS-301.

R4b: methylhydrosiloxane-dimethylsiloxane copolymer having a molecular weight of Mn=1900-2000 g/mol and a methylhydrogensiloxy content of 15-18 mol %, available from Gelest, Inc. (65933 Frankfurt am Main, Germany) under the product name HMS-151.

R4c: methylhydrosiloxane-dimethylsiloxane copolymer having a molecular weight of Mn=900-1200 g/mol and a methylhydrogensiloxy content of 50-55 mol %, available from Gelest, Inc. (65933 Frankfurt am Main, Germany) under the product name HMS-501.

Hydrosilylation Catalyst as Per Constituent (C):

R5: UV-activetable platinum catalyst: trimethyl-(methylcyclopentadienyl)platinum(IV), available from Sigma-Aldrich®, Taufkirchen, Germany.

Reinforcing Agent as Per Constituent (D):

R6: a hydrophobized fumed silica having a BET surface area of 300 m²/g was produced analogously to patent specification DE 38 39 900 A1 by hydrophobization from a hydrophilic fumed silica, Wacker HDK® T-30 (available from WACKER CHEMIE AG, Munich, Germany).

Rheological Agent as Per Constituent (E):

R7: Genapol PF 20 is an EO-PO block copolymer having 20% by weight of ethylene oxide in the polymer, CAS No. [9003-11-6], from Clariant GmbH, D-65926 Frankfurt am Main, Germany R8: Genapol PF 40 is an EO-PO block copolymer having 40% by weight of ethylene oxide in the polymer, CAS No. [9003-11-6], from Clariant GmbH, D-65926 Frankfurt am Main, Germany R9: epoxidized linseed oil, CAS No. 67746-08-1, "Edenol® B 316 Spezial"; from Emery Oleochemicals GmbH, Henkelstr. 67, 40589 Düsseldorf, R10: Desmophen C 1200, a linear OH-terminal polycarbonate polyester from Bayer Materials Science R11: Sipell RE 63 F, an epoxy-functional polysiloxane from Wacker Chemie AG, Munich R12: (3-glycidoxypropyl)trimethoxysilane, 98%, available from ABCR GmbH, 76187 Karlsruhe, Germany, CAS No. [2530-83-8], under the article no./product name AB111152

R13: (3-glycidoxypropyl)methyldimethoxysilane, 97%, CAS No. [65799-47-5], available from ABCR GmbH, 76187 Karlsruhe, Germany, under the product name AB111150

R14: (3-glycidoxypropyl)methyldiethoxysilane, CAS No. [2897-60-1], available from ABCR GmbH, 76187 Karlsruhe, Germany, under the product name AB111149

R15: DRAPEX 39, an epoxidized soybean oil from Galata Chemicals GmbH, Chemiestraße 22, 68623 Lampertheim, CAS No. [801307-8]

R16: triethyl citrate, CAS No. [77-93-0], available from Sigma-Aldrich

R17: TWEEN™ 20, ethoxylated sorbitan ester, available from Croda GmbH

R18: TWEEN™ 28, ethoxylated sorbitan ester, available from Croda GmbH

R19: TWEEN™ 60, ethoxylated sorbitan ester, available from Croda GmbH

R20: TWEEN™ 80, ethoxylated sorbitan ester, available from Croda GmbH

R21: TWEEN™ 85, ethoxylated sorbitan ester, available from Croda GmbH

R22: Wacker® IM 22, glycol-functional silicone oil, available from Wacker Chemie AG R23: Pulpsil® 955 S, polyether-modified silicone oil, available from Wacker Chemie AG R24: Pulpsil® 960 S, polyether-modified silicone oil, available from Wacker Chemie AG Optional Constituent (F)

R26: stabilizer (inhibitor) 1-ethynylcyclohexanol; 99%, CAS No. 78-27-3, ≥99%, available from ABCR GmbH, 76187 Karlsruhe, Germany Inventive and Noninventive Examples 1-30

The silicone rubber compositions were produced by, in a first step, intimately mixing constituent (A) and constituent (D) as described hereinafter in the weight ratios specified in tables 1-4. For this purpose, 60% by weight of the total mass of constituent (A) in the form of 255 g was initially charged in a double-Z kneader at a temperature of 25° C. and the kneader was heated to 70° C. On attainment of 70° C., the total amount of constituent (D), i.e. the hydrophobic fumed silica described as reactant R6, corresponding to the weight ratios given in tables 1-4, was metered in and kneaded in in portions with continuously kneading over the course of 1 hour, and the material was homogenized. Subsequently, the resultant material of relatively high viscosity was kneaded and devolatilized under an oil-pump vacuum (<100 hPa) at 150° C. over the course of 1 hour. After this baking phase, the vacuum was broken and the temperature was adjusted to room temperature. Then the remaining 40% by weight of the total mass of constituent (A), i.e. 170 g, were mixed in and the material was homogenized at room temperature over the course of one hour.

The further production of the silicone rubber compositions was effected (under yellow light or with exclusion of light) by intimate mixing of the mixture of (A) and (D) produced by the method as described above with the other constituents (B), (E) (F) and (C) in Speedmixer® screwtop mixing beakers from Hauschild & Co. KG, Waterkamp 1, 59075 Hamm. For this purpose, the components were successively weighed into the appropriate mixing beaker and mixed manually. Subsequently, the beaker that had been closed with an appropriate screwtop was mixed and degassed at 1500 rpm under a vacuum of 100 mbar in a vacuum Speedmixer® DAC 400.2 VAC-P from Hauschild & Co. KG, Waterkamp 1, 59075 Hamm for at least 5 minutes.

Prior to the vacuum mixing operation in the vacuum Speedmixer®, a small hole was drilled into the screwtop in order to allow the air to escape from the mixing beaker. Subsequently, the material was dispensed from the mixing beaker into an opaque 30 ml Luer lock cartridge in an air-free manner (with the aid of a Hauschild dispensing system, consisting of an appropriate speed disc and a lever press). Subsequently, the cartridge was sealed with an appropriate expulsion plunger (plastic piston).

The compositions of the inventive and noninventive silicone rubber compositions are given in tables 1 to 4.

TABLE 1

(all figures in % by weight except for R5 in ppm by weight based on Pt metal):

| Constituent | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| (A) | R1 | 18 | 11 | 11 | 11 | 11 | 11 | 11 | 18 | 18 |
| | R2 | 5 | 8 | 8 | 8 | 8 | 8 | 8 | 5 | 5 |
| | R3 | 51 | 54 | 54 | 54 | 54 | 54 | 54 | 52 | 52 |
| (B) | R4a | 5.0 | 4.8 | 4.8 | 4.8 | 4.8 | 4.5 | 4.5 | 5.0 | 5.0 |
| (C) | R5 | 15 | 27 | 27 | 27 | 27 | 15 | 15 | 15 | 15 |
| (D) | R6 | 20 | 21 | 21 | 21 | 21 | 22 | 22 | 20 | 20 |
| | (E) | 1 | 1 | 1 | 1 | 1 | 0.05 | 0.1 | 0.05 | 0.05 |
| | | R12 | R13 | R14 | R11 | R10 | R8 | R8 | R7 | R9 |
| (F) | R26 | | | | | 0.0025 | | | | |
| | | Relaxation time τ | | | | | | | | |
| τ [sec] | | 3.4 | 2.7 | 4.2 | 1.0 | 1.2 | 3.5 | 0.05 | 5.3 | 6.7 |
| | | Viscosity $\eta_{MP1}$ of the (E)-containing composition | | | | | | | | |
| [Pa · s] | | 323 | 858 | 769 | 1320 | 1440 | 823 | 1530 | 269 | 215 |
| | | Viscosity $\eta_{MP1}$ of the (E)-free composition | | | | | | | | |
| [Pa · s] | | 79 | 153 | 153 | 153 | 153 | 112 | 112 | 79 | 79 |

TABLE 2

(all figures in % by weight except for R5 in ppm by weight based on Pt metal):

| Constituent | | Ex. 10*) | Ex. 11*) | Ex. 12*) | Ex. 13*) | Ex. 14 | Ex. 15 | Ex. 16 |
|---|---|---|---|---|---|---|---|---|
| (A) | R1 | 5 | 8 | 9 | 8 | 18 | 18 | 18 |
| | R2 | 5 | 9 | 9 | 9 | 5 | 5 | 5 |
| | R3 | 60 | 55 | 57 | 57 | 52 | 52 | 52 |
| (B) | R4a | — | — | 3.2 | 2.2 | 5.0 | 5.0 | 5.0 |
| | R4b | 4.0 | 6.8 | — | — | — | — | — |
| | R4c | — | — | — | 2.2 | — | — | — |
| (C) | R5 | 15 | 15 | 15 | 15 | 15 | 15 | 15 |
| (D) | R6 | 26 | 21 | 22 | 22 | 20 | 20 | 20 |
| (E) | R15 | — | — | — | — | 0.1 | 0.5 | 1.0 |
| (F) | R26 | | | | 0.0025 | | | |
| | | Relaxation time τ | | | | | | |
| τ [sec] | | 10.4 | 14.9 | 13.2 | 13.6 | 2.5 | 0.7 | 0.6 |
| | | Viscosity $\eta_{MP1}$ of the (E)-containing composition | | | | | | |
| [Pa · s] | | — | — | — | — | 389 | 992 | 1040 |
| | | Viscosity $\eta_{MP1}$ of the (E)-free composition | | | | | | |
| [Pa · s] | | 293 | 97 | 126 | 122 | 79 | 79 | 79 |

*)noninventive

TABLE 3

(all figures in % by weight except for R5 in ppm by weight based on Pt metal):

| Constituent | | Ex. 17*) | Ex. 18 | Ex. 19 | Ex. 20*) | Ex. 21 | Ex. 22 | Ex. 23 |
|---|---|---|---|---|---|---|---|---|
| (A) | R1 | 18 | 18 | 18 | 18 | 18 | 18 | 18 |
| | R2 | 5 | 5 | 5 | 5 | 5 | 5 | 5 |
| | R3 | 52 | 52 | 52 | 52 | 52 | 52 | 52 |
| (B) | R4a | 5.0 | 5.0 | 5.0 | 5.0 | 5.0 | 5.0 | 5.0 |
| (C) | R5 | 15 | 15 | 15 | 15 | 15 | 15 | 15 |
| (D) | R6 | 20 | 20 | 20 | 20 | 20 | 20 | 20 |
| (E) | | 0.1 | 0.5 | 0.1 | 0.1 | 0.5 | 0.1 | 0.1 |
| | | R16 | R16 | R17 | R18 | R18 | R19 | R20 |
| (F) | R26 | | | | 0.0025 | | | |

TABLE 3-continued (all figures in % by weight except for
R5 in ppm by weight based on Pt metal):

| Constituent | Ex. 17*) | Ex. 18 | Ex. 19 | Ex. 20*) | Ex. 21 | Ex. 22 | Ex. 23 |
|---|---|---|---|---|---|---|---|
| Relaxation time τ | | | | | | | |
| τ [sec] | 14.6 | 5.5 | 1.6 | 15.6 | 5.8 | 1.6 | 1.4 |
| Viscosity $\eta_{MP1}$ of the (E)-containing composition | | | | | | | |
| [Pa · s] | 101 | 230 | 468 | 93 | 162 | 499 | 571 |
| Viscosity $\eta_{MP1}$ of the (E)-free composition | | | | | | | |
| [Pa · s] | 79 | 79 | 79 | 79 | 79 | 79 | 79 |

*)noninventive; in noninventive ex. 17 and 20 the increase in the surface energy of the filler resulting from R16 or R17 is too small, resulting in excessively long relaxation times. This problem can be remedied by increasing the concentration of (E) (cf. inventive ex. 18 and 21).

TABLE 4

(all figures in % by weight except for
R5 in ppm by weight based on Pt metal):

| Constituent | | Ex. 24 | Ex. 25 | Ex. 26 | Ex. 27 | Ex. 28*) | Ex. 29*) | Ex. 30*) |
|---|---|---|---|---|---|---|---|---|
| (A) | R1 | 18 | 18 | 18 | 18 | 18 | 14 | 12 |
|  | R2 | 5 | 5 | 5 | 5 | 4 | 9 | 12 |
|  | R3 | 52 | 52 | 52 | 52 | 57 | 56 | 55 |
| (B) | R4a | 5.0 | 5.0 | 5.0 | 5.0 | 5.0 | 5.0 | 5.0 |
| (C) | R5 | 15 | 15 | 15 | 15 | 15 | 15 | 15 |
| (D) | R6 | 20 | 20 | 20 | 20 | 16 | 16 | 16 |
|  | (E) | 0.1 R21 | 0.1 R22 | 0.1 R23 | 0.1 R24 | — | — | — |
| (F) | R26 | | | | 0.0025 | | | |
| Relaxation time τ | | | | | | | | |
| τ [sec] | | 3.2 | 4.9 | 1.8 | 3.0 | 17.7 | 17.6 | 17.5 |
| Viscosity $\eta_{MP1}$ of the (E)-containing composition | | | | | | | | |
| [Pa · s] | | 343 | 263 | 473 | 389 | — | — | — |
| Viscosity $\eta_{MP1}$ of the (E)-free composition | | | | | | | | |
| [Pa · s] | | 79 | 79 | 79 | 79 | 30 | 31 | 32 |

*)noninventive

DOD-3D Printer:

The silicone rubber compositions produced were processed by the DOD method in a "NEO-3D printer" manufacturing system from "German RepRap GmbH" to give silicone elastomer parts. For this purpose, the abovementioned 3D printer was modified and adapted. The thermoplastic filament dosage unit that was originally installed in the "NEO-3D printer" was replaced by a jetting nozzle from "Vermes Microdispensing GmbH, Otterfing", in order to be able to deposit higher-viscosity to firm pasty materials such as the silicone rubber compositions of the invention in the DOD method.

Since the "NEO" printer was not equipped as standard for the installation of jetting nozzles, it was modified. The Vermes jetting nozzle was incorporated into the printer control system such that the start-stop signal (trigger signal) of the Vermes jetting nozzle was actuated by the G code controller of the printer. For this purpose, a special signal was recorded in the G code controller. The G code controller of the computer used this merely to switch the jetting nozzle on and off (starting and stopping of metering).

For the signal transmission of the start-stop signal, the heating cable of the originally installed filament heating nozzle of the "NEO" printer was severed and connected via a relay to the Vermes nozzle.

The other dosage parameters (metering frequency, rising, falling etc.) of the Vermes jetting nozzle were adjusted by means of the MDC 3200+ Microdispensing Control Unit. The 3D printer was controlled by means of a computer. The software control and control signal connection of the 3D printer (software: "Repetier-Host") was modified to the effect that both the movement of the dosage nozzle in the three spatial directions and the signal for droplet deposition were thus controllable. The maximum speed of movement of the "NEO" 3D printer was 0.3 m/s.

Dosage System:

The dosage system used for the silicone rubber compositions used was the "MDV 3200A" microdispensing dosage system from "Vermes Microdispensing GmbH", consisting of a complete system having the following components: a) MDV 3200 A—dosage unit with an attachment for Luer lock cartridges, with which 3-8 bar compressed air (hose with adapter) was applied to the top end of the cartridge, b) Vermes MDH-230tfl left nozzle trace-heating system, c) MDC 3200+ MicroDispensing Control Unit, which was in turn connected to the PC controller and via movable cables to the nozzle, enabled the setting of the jetting dosage parameters (rising, falling, opentime, needlelift, delay, no pulse, heater, nozzle, distance, voxel diameter, air supply pressure at the cartridge). Nozzles having diameters of 50, 100, 150 and 200 µm are available. It was thus possible to precisely position ultrafine droplets of the silicone rubber composition in the nanoliter range at any desired xyz position on the workbench or the already crosslinked silicone elastomer layer. Unless stated otherwise, the standard nozzle set installed in the Vermes valve was a 200 µm nozzle. The reservoir vessels used for the silicone rubber composition were upright 30 ml Luer lock cartridges that were screwed onto the dispensing nozzle in a liquid-tight manner and pressurized with compressed air.

The modified "NEO" 3D printing and the "Vermes" dosage system were controlled with a PC and an open source software package "Simplify 3D".

Jetting:

The silicone rubber compositions were repeatedly deposited dropwise in layers of the desired geometry with the jetting nozzle parameters specified hereinafter on a glass microscope slide of area 25×75 mm, with continuous irradiation and resultant crosslinking of the deposited material over the entire printing operation (about 50 sec) with a BLUEPOINT irradiation system having an output of 13 200 mW/cm².

Nozzle diameter: 200 µm, rising: 0.3 ms, falling: 0.1 ms, open time: 15 ms, needle lift: 100%, delay (surface pressure): 25 ms, delay (individual points for the voxel size measurement): 100 ms, heating: 45° C., cartridge supply pressure: 3 bar.

In this way, it was possible to use the silicone rubber compositions of the invention to obtain transparent silicone elastomer parts of different geometry.

Example 1

The silicone rubber composition of the invention has a relaxation parameter of τ=3.4 sec and was jettable without any problem in the DOD method (voxel diameter 0.6 mm) and could be built up layer by layer to form a transparent rectangular spiral with external dimensions 20×20 mm and a height of 5 mm (cf. FIG. 1) made from silicone elastomer.

Example 2

The silicone rubber composition of the invention has a relaxation parameter of τ=2.7 sec and was jettable without any problem in the DOD method (voxel diameter 0.4 mm) and processible layer by layer to form a cuboidal silicone elastomer part having dimensions of 15×15×3 mm. FIG. 6 shows the measurement curve of example 2 determined by means of the rheological test method (solid line) as compared with the theoretical plot (dotted line) according to formula (III).

Example 3

Figure 2:
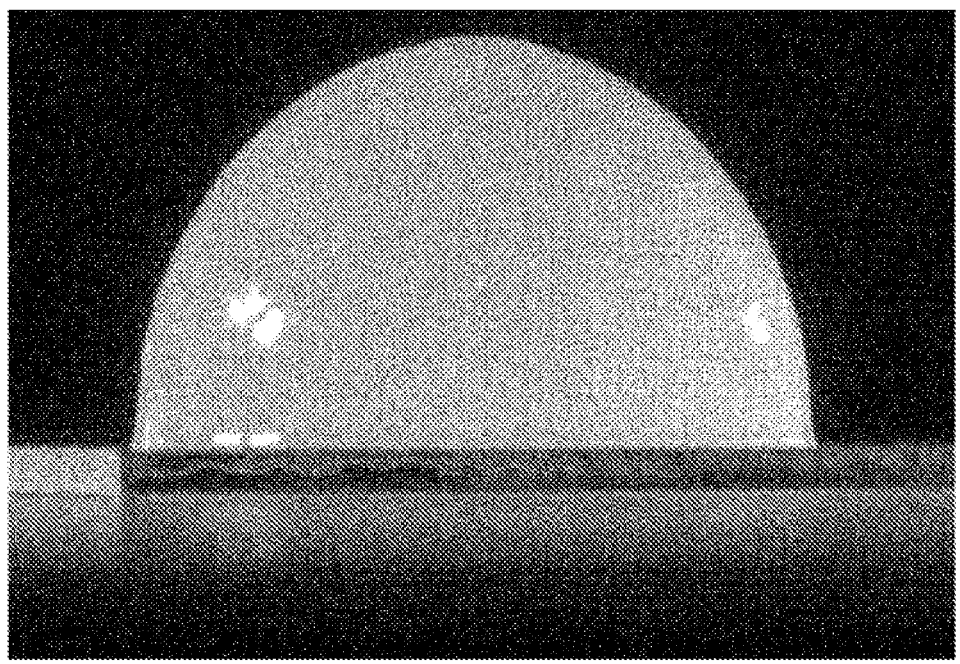
FIG. 2 illustrates a further embodiment of a 3-D molding produced in accordance with the invention.

The silicone rubber composition of the invention has a relaxation parameter of τ=4.2 sec and was jettable without any problem in the DOD method (voxel diameter 0.4 mm) and processible layer by layer to give a silicone elastomer hemisphere having a diameter of 15 mm (cf. FIG. 2).

Example 4

Figure 3:
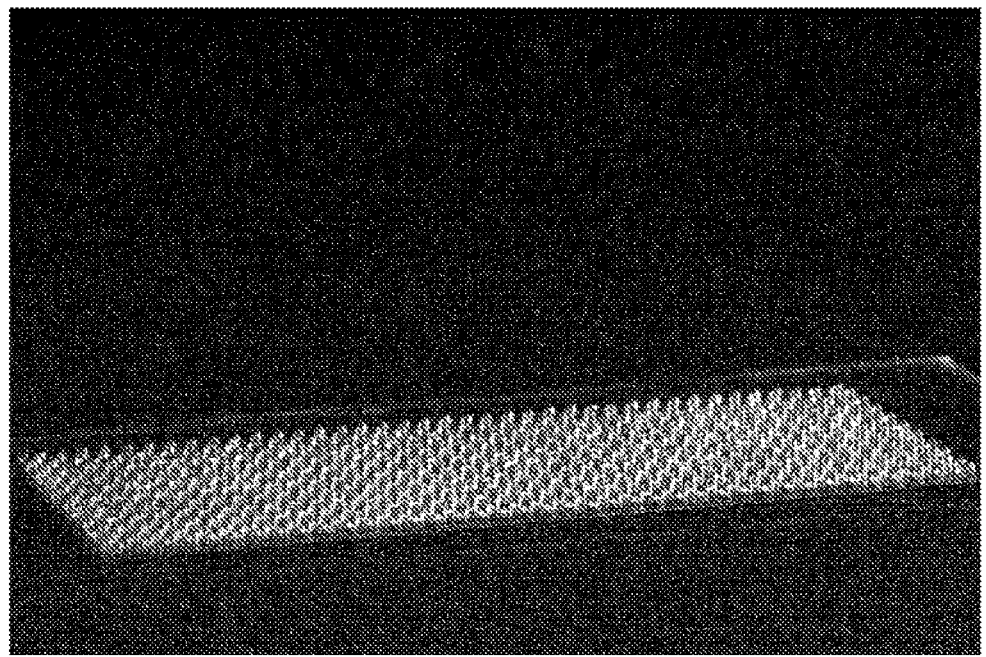
FIG. 3 illustrates a yet further embodiment of a 3-D molding produced in accordance with the invention.

The silicone rubber composition of the invention has a relaxation parameter of τ=0.99 sec and was jettable without any problem in the DOD method (voxel diameter 0.4 mm) and processible layer by layer to give a silicone elastomer part with a structured surface (cf. FIG. 3).

Example 5

The silicone rubber composition of the invention has a relaxation parameter of τ=1.21 sec and was jettable without any problem in the DOD method (voxel diameter 0.4 mm) and processible layer by layer to form a cuboidal silicone elastomer part having dimensions of 15×15×3 mm.

Example 6

Figure 4:
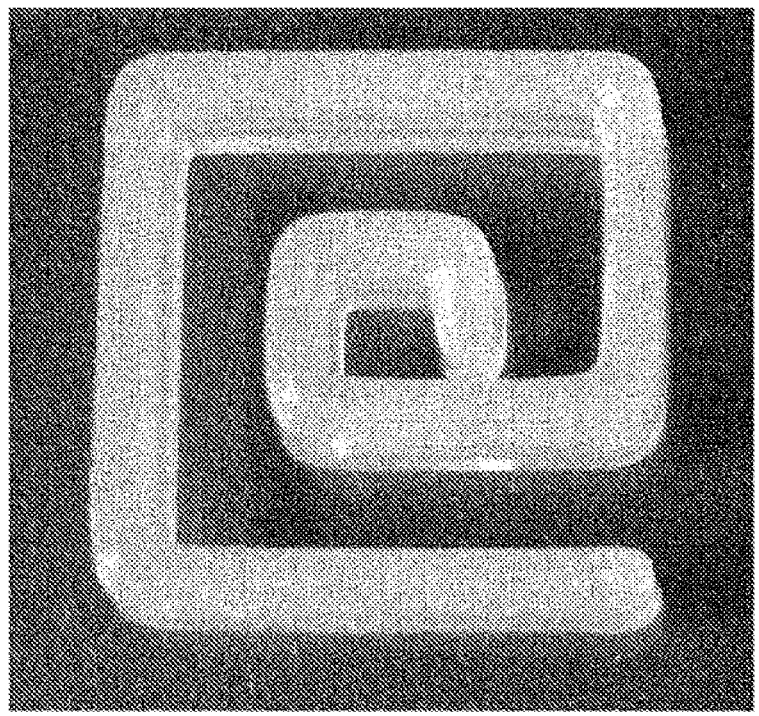
FIG. 4 illustrates another embodiment of a 3-D molding produced in accordance with the invention.

The silicone rubber composition of the invention has a relaxation parameter of τ=3.54 sec and was jettable without any problem in the DOD method (voxel diameter 0.6 mm) and processible layer by layer to form a spiral silicone elastomer part (cf. FIG. 4).

Example 7

Figure 5:
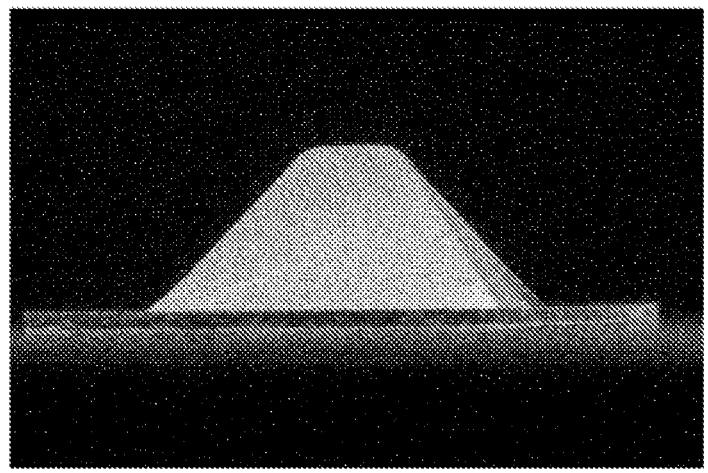
FIG. 5 illustrates a still further embodiment of a 3-D molding produced in accordance with the invention.

The silicone rubber composition of the invention has a relaxation parameter of τ=0.05 sec and was jettable without any problem in the DOD method (voxel diameter 0.6 mm). By layer-by-layer buildup without UV irradiation, the green body of a square-based pyramid having dimensions of 20×20×10 mm was produced and only then crosslinked by irradiating the green body with the BLUEPOINT irradiation system with a power of 13,200 mW/cm for 10 seconds. The result was a transparent silicone elastomer pyramid (cf. FIG. 5).

Example 8

The silicone rubber composition of the invention has a relaxation parameter of τ=5.33 sec and was jettable without any problem in the DOD method (voxel diameter 0.6 mm) and processible layer by layer to form a cuboidal silicone elastomer part with dimensions of 15×15×3 mm.

Example 9

The silicone rubber composition of the invention has a relaxation parameter of τ=6.68 sec and was jettable without any problem in the DOD method (voxel diameter 0.6 mm) and processible layer by layer to form a cuboidal silicone elastomer part with dimensions of 15×15×3 mm.

Example 10, 11, 12, 13 (Noninventive)

Figure 7:
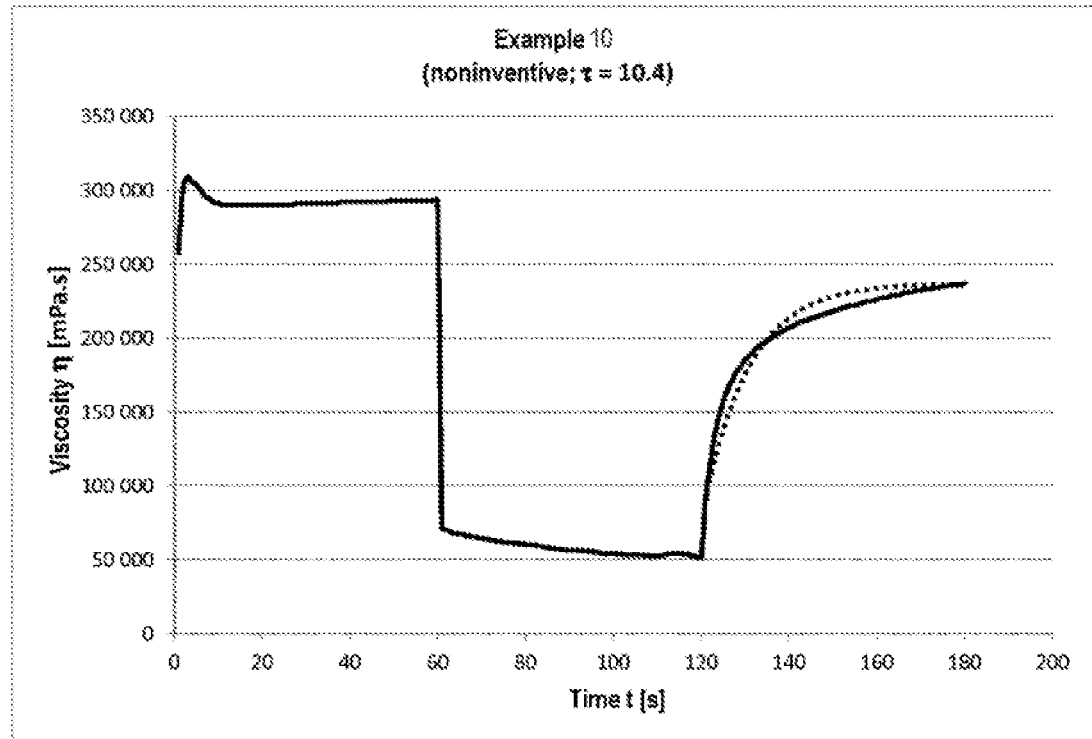
FIG. 7 illustrates a molding produced with a non-inventive silicone composition, showing non-sharp printing.
Figure 8:
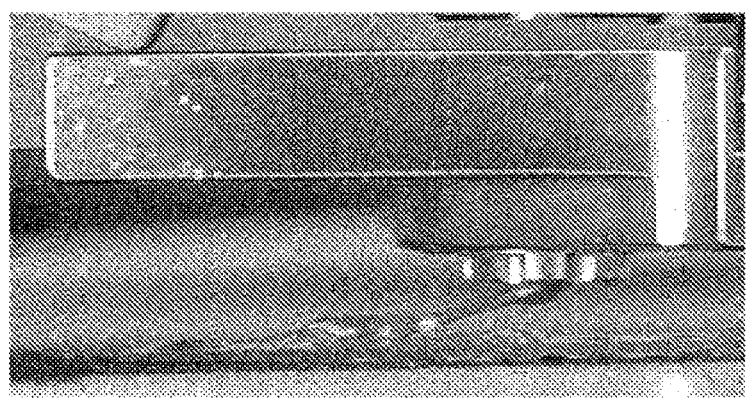
FIG. 8 illustrates blockage of a print valve by a non-inventive silicone composition.

The jetting of these silicone rubber compositions gave an unclean print, which was caused by incomplete separation of the individual droplets in some cases (the droplets remained joined to one another via thin threads, meaning that droplet detachment was incomplete). In addition, the droplets hitting the workbench formed very broad flat voxels, the diameter of which was about 1500 μm. As a result of this diffluence during printing, it was not possible to depict finer structural details. The noninventive silicone rubber compositions showed a tendency to blockage of the nozzle after a short time, since the materials, even without a pressure signal, ran through the jetting valve solely as a result of the supply pressure in the cartridge. No prolonged stability of DOD 3D printing was possible. FIG. 7 shows the measurement curve for example 10 determined by means of the rheological test method (solid line) as compared with the theoretical plot (dotted line) according to formula (III). The blockage of the print valve during the printing operation is shown by FIG. 8.

Example 10 (Noninventive)

Figure 9:
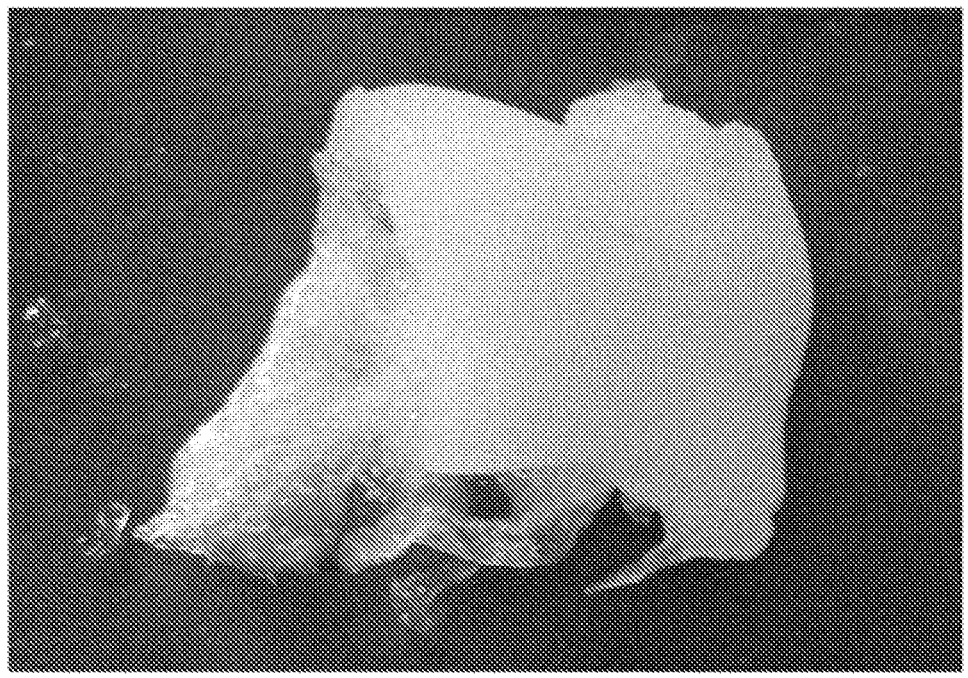
FIG. 9 illustrates non-sharp printing with a non-inventive composition.

An attempt was made with the noninventive silicone rubber composition from example 10, by layer-by-layer buildup with simultaneous UV irradiation, to produce a cuboidal silicone elastomer part having dimensions of 15×15×3 mm.
Even the first print layer showed an unsharp print. Later on in the printing process, the nozzle blocked completely, such that it was no longer possible to dispense defined individual droplets; instead, the material was deposited irregularly on the component from the blocked jetting nozzle, resulting in a misshapen molding. The molding also had visible air bubbles (cf. FIG. 9).

Example 11 (Noninventive)

Figure 10:
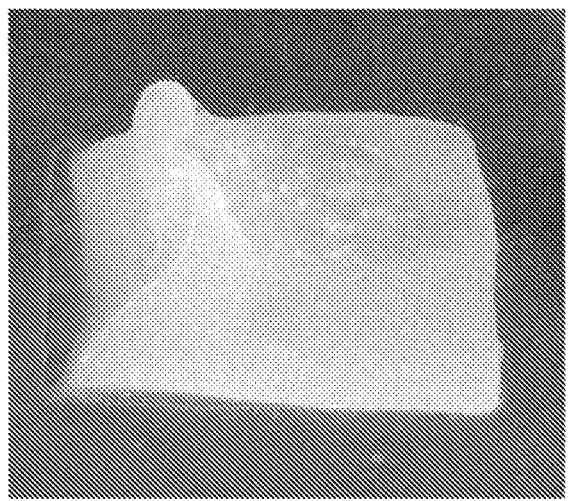
FIG. 10 illustrates non-sharp printing with a further non-inventive composition.

An attempt was made with the noninventive silicone rubber composition, by layer-by-layer buildup without UV irradiation of the green body, to produce a cuboidal silicone elastomer part with dimensions of 15×15×3 mm. The nozzle of the jetting dosage valve here became completely blocked with the deposited material immediately after commencement of the trial print. Continuation of the print program produced an irregular, misshapen crosslinked molding having visible air bubbles. After the print program had ended, the green body was crosslinked by irradiating it with the BLUEPOINT irradiation system with a power of 13,200 mW/cm for 10 seconds (cf. FIG. 10).

Example 28, 29, 30 (Noninventive)

Figure 11:
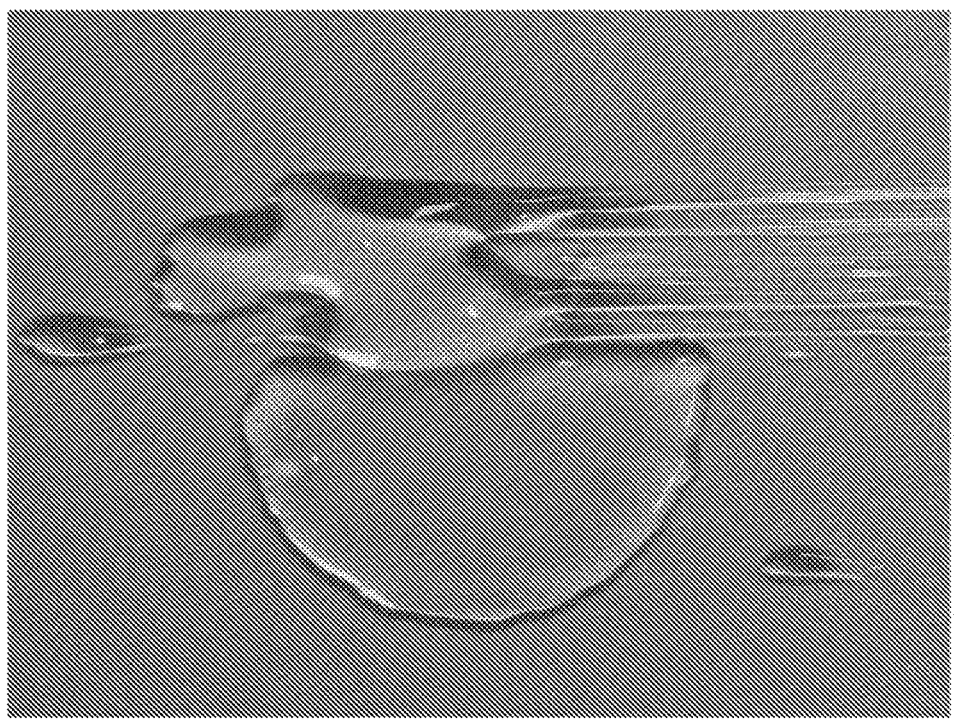
FIG. 11 illustrates failure of a non-inventive composition in 3-D printing

An attempt was made with the noninventive silicone rubber composition from example 28, by layer-by-layer buildup without UV irradiation of the green body, to deposit a hemispherical component with diameter 20 mm on a glass microscope slide. The noninventive formulations led to even quicker escape of the silicone compositions from the nozzle opening of the jetting nozzle. Even during the deposition of the first layer, a droplet formed on the underside of the jetting valve, which increased further in size owing to the further composition escaping from the nozzle opening. The droplet smeared the already deposited print layer. Thereafter, the further print operation was stopped (cf. FIG. 11).

The invention claimed is:

1. A crosslinkable silicone rubber composition for the 3D printing of silicone components in the ballistic additive DOD method, comprising:
   (A) 50% to 95% by weight of at least one linear organosilicon compound having at least two aliphatically unsaturated groups per molecule,
   (B) 1% to 10% by weight of at least one organosilicon compound having at least two SiH groups per molecule,
   and optionally, in addition to (A) and (B),
   (G) at least one organosilicon compound having at least two aliphatically unsaturated groups and at least two SiH groups per moleculep;
   or, in place of (A)+(B)+(G),
   (G') 50%-95% by weight of at least one organosilicon compound having at least two aliphatically unsaturated groups and at least two SiH groups per molecule;
   (C) 0.1 to 500 ppm by weight of at least one metal-containing hydrosilylation catalyst, based on the content of the metal of the metal-containing hydrosilylation catalyst relative to the overall silicone rubber composition;
   and
   (D) 1% to 30% by weight of at least one reinforcing material, in combination with
   (E) 0.01% to 2% by weight of a rheological agent which contains polar groups and is selected from (E1), (E2) and (E3) and mixtures thereof:
      (E1) epoxy group-functional compounds,
      (E2) (poly)ether group-functional compounds;
      (E3) (poly)ester group-functional compounds,
   where two or more of epoxy, ether, and ester groups are optionally present in a single molecule; and
   (F) 0% to 30% by weight of auxiliaries other than (D) and (E),
wherein the relaxation time τ of the silicone rubber composition at 25° C. is within the range $$0\ \text{seconds} < \tau \leq 10\ \text{seconds},$$

where τ is calculated from formula (III):

$$\eta(t) = \eta_{max} + (\eta_0 - \eta_{max}) * \text{EXP}(-t/\tau), \quad (III)$$

where
   $\eta(t)$ is the viscosity at time t at 25° C.,
   $\eta_{max}$ denotes the maximum viscosity at 25° C. attained within a given time when shearing at a shear rate of 0.5 s$^{-1}$ has stopped,
   $\eta_0$ is the viscosity measured immediately after shearing at 25 s$^{-1}$, and
   EXP means the e function,
with the proviso that the viscosity $\eta_{MP1}$ of the silicone rubber composition comprising all the constituents except for constituent (E) is not more than 300,000 mPa·s.

2. The silicone rubber composition of claim 1, wherein the relaxation time τ of the silicone rubber composition is within the range:

$$0\ \text{seconds} < \tau \leq 7\ \text{seconds}.$$

3. The silicone rubber composition of claim 1, wherein the relaxation time τ of the silicone rubber composition is within the range:

$$0\ \text{seconds} < \tau \leq 5\ \text{seconds}.$$

4. The silicone rubber composition of claim 1, wherein (E) is an epoxy-functional organic compound (E1).

5. The silicone rubber composition of claim 1, wherein (D) is selected from the group consisting of fumed silica, precipitated silica, and mixture thereof.

6. The silicone rubber composition of claim 1, which is crosslinkable by initiation by UV or UV-VIS radiation.

7. The silicone rubber composition of claim 1, wherein, for every one gram of constituent (D), there is at least 0.1 µmol to at most 100 mmol of polar groups of constituent (E).

8. A process for producing an elastomeric shaped body, comprising forming the shaped body a silicone rubber composition of claim 1 by means of a ballistic additive DOD method (3D printing).

9. An elastomeric shaped body produced by means of ballistic additive DOD methods (3D printing) employing the crosslinkable silicone composition of claim 1.

* * * * *